US008214637B2

(12) United States Patent
Oka et al.

(10) Patent No.: US 8,214,637 B2
(45) Date of Patent: *Jul. 3, 2012

(54) PUBLIC KEY CERTIFICATE ISSUING SYSTEM, PUBLIC KEY CERTIFICATE ISSUING METHOD, DIGITAL CERTIFICATION APPARATUS, AND PROGRAM STORAGE MEDIUM

(75) Inventors: Makoto Oka, Chiba (JP); Yoshihito Ishibashi, Tokyo (JP); Shinako Matsuyama, Tokyo (JP); Hideaki Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/659,289

(22) Filed: Mar. 3, 2010

(65) Prior Publication Data

US 2010/0228970 A1 Sep. 9, 2010

Related U.S. Application Data

(63) Continuation of application No. 10/041,964, filed on Jan. 9, 2002, now abandoned.

(30) Foreign Application Priority Data

Jan. 10, 2001 (JP) .................................. 2001-002220

(51) Int. Cl.
*H04L 9/32* (2006.01)
*G06F 7/04* (2006.01)
*G06F 12/14* (2006.01)

(52) U.S. Cl. ............. 713/156; 713/175; 726/10; 726/18

(58) Field of Classification Search ....................... None
See application file for complete search history.

(56) References Cited

U.S. PATENT DOCUMENTS

| 5,659,616 | A | * | 8/1997 | Sudia ............................. 705/76 |
| 5,958,051 | A | * | 9/1999 | Renaud et al. .................. 726/22 |
| 6,035,402 | A | * | 3/2000 | Vaeth et al. ...................... 726/2 |
| 6,202,157 | B1 | * | 3/2001 | Brownlie et al. ................. 726/1 |
| 6,490,680 | B1 | | 12/2002 | Scheidt et al. |
| 6,675,296 | B1 | * | 1/2004 | Boeyen et al. ................ 713/156 |
| 7,610,614 | B1 | * | 10/2009 | Frankel et al. .................... 726/4 |

FOREIGN PATENT DOCUMENTS

| JP | 10-504150 T | 4/1998 |
| JP | 10-285157 A | 10/1998 |
| JP | 10-327147 A | 12/1998 |
| JP | 2000-224164 A | 8/2000 |
| JP | 2002-207427 A | 7/2002 |

OTHER PUBLICATIONS

English Translation of Notification of Reasons for Refusal dated Dec. 2, 2010 for corresponding Japanese Application No. 2001-002220.
Boneh et al., "On the Importance of Checking Cryptographic Protocols for Faults," 1997, Springer-Verlag, "Advances in Cryptology—Eurocrypt '97 LNCS 1233," pp. 37-57.

* cited by examiner

*Primary Examiner* — William Powers
(74) *Attorney, Agent, or Firm* — Rader Fishman & Grauer, PLLC

(57) ABSTRACT

A public key certificate issuing system is disclosed which comprises a certificate authority for issuing a public key certificate for an entity, the certificate authority including a plurality of signature modules each executing a different encryption algorithm and a registration authority that receives a public key certificate issuance request from the entity.

20 Claims, 26 Drawing Sheets

F I G. 2
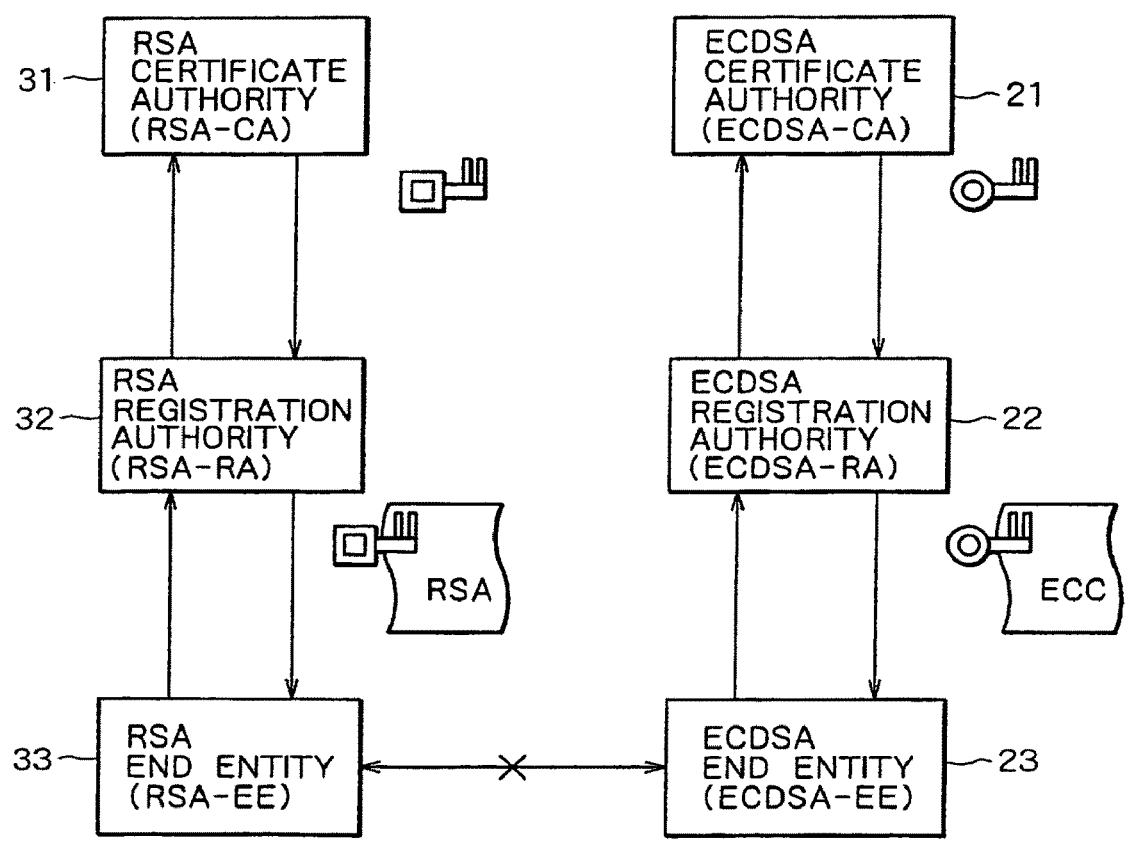

FIG. 4

EXAMPLE OF CERTIFICATE FORMAT (BASED ON X.509 V3)

| ITEMS | DESCRIPTION | SETTINGS WITH THIS IA |
|---|---|---|
| Version 1 | | |
| version | VERSION OF CERTIFICATE FORMAT | V3 |
| serial Number | CERTIFICATE SERIAL NUMBER FURNISHED BY IA | SEQUENTIAL SERIAL NUMBER |
| signature.algorithm Identifier algorithm parameters | CERTIFICATE SIGNATURE ALGORITHM AND PARAMETERS | ·ELLIPTIC CURVE CRYPTOGRAPHY OR RSA ·PARAMETERS IN THE CASE OF ELLIPTIC CURVE CRYPTOGRAPHY ·KEY LENGTH IN THE CASE OF RSA |
| issuer | IA NAME (DISTINGUISHED NAME FORMAT) | NAME OF THIS IA |
| validity notBefore notAfter | VALIDITY OF CERTIFICATE ·STARTING DATE AND TIME ·ENDING DATE AND TIME | |
| subject | USER IDENTIFICATION NAME | USER DEVICE ID OR SERVICE ENTITY ID |
| subject Public Key Info algorithm subject Public key | USER'S PUBLIC KEY INFORMATION ·KEY ALGORITHM ·PUBLIC KEY | ·ELLIPTIC CURVE CRYPTOGRAPHY OR RSA ·USER'S PUBLIC KEY |
| Version 3 | | |
| authority Key Identifier key Identifier authority Cert Issuer authority Cert Serial Number | ·KEY IDENTIFIER FOR SIGNATURE VERIFICATION BY IA ·KEY ID NUMBER (OCTAL) ·IA NAME (GENERAL NAME FORMAT) ·CERTIFICATE SERIAL NUMBER | |
| subject key Identifier | APPLICABLE WHERE MULTIPLE KEYS NEED TO BE CERTIFIED | NOT USED |
| key usage (0)digital Signature (1)non Repudiation (2)key Encipherment (3)data Encipherment (4)key Agreement (5)key CertSign (6)cRL Sign | THE PURPOSE OF KEY USAGE IS DESIGNATED (0)FOR DIGITAL SIGNATURE (1)FOR REPUDIATION PREVENTION (2)FOR KEY ENCRYPTION (3)FOR MESSAGE ENCRYPTION (4)FOR DISTRIBUTION OF COMMON KEY (5)FOR VERIFICATION OF SIGNATURE ON CERTIFICATE (6)FOR VERIFICATION OF SIGNATURE ON CERTIFICATE REVOCATION LIST | USAGE (0), (1), (4) AND (6) APPLY |
| private Key Usage Period notBefore notAfter | USAGE PERIOD OF USER'S PRIVATE KEY | USAGE PERIOD OF CERTIFICATE=USAGE PERIOD OF PUBLIC KEY=USAGE PERIOD OF PRIVATE KEY (DEFAULT) |

FIG. 5

| | | |
|---|---|---|
| policy Mappings<br>  issuer Domain Policy<br>  subject Domain Policy | NECESSARY ONLY WHEN CA IS CERTIFIED. AN ISSUER DOMAIN POLICY AND A SUBJECT DOMAIN POLICY ARE DEFINED. | NONE BY DEFAULT |
| supported Algorithms<br>  algorithm Identifier<br>  intended Usage<br>  intended Certificate<br>Policies | ATTRIBUTES OF THE DIRECTORY (X.500) ARE DEFINED. WHEN THE OPPOSITE PARTY OF COMMUNICATION IS TO USE DIRECTORY INFORMATION, THAT PARTY IS INFORMED OF THE DIRECTORY ATTRIBUTES IN ADVANCE. | NONE BY DEFAULT |
| subject Alt Name | USER'S ALTERNATIVE NAME (GENERAL NAME FORMAT). | NOT USED |
| issuer Alt Name | THIS FIELD IS INCLUDED (NONE BY DEFAULT). | NONE BY DEFAULT |
| subject Directory Attributes | USER'S ANY ATTRIBUTES. | NOT USED |
| basic Constraints<br>  cA<br>  path Len Constraint | THIS FIELD SPECIFIES WHETER THE PUBLIC KEY SUBJECT TO CERTIFICATION IS TO BE SIGNED BY THE CERTIFICATE AUTHORITY (CA) OR USED BY THE USER. | USED BY USER BY DEFAULT |
| name Constraints<br>  permitted Subtrees<br>    base<br>    minimum<br>    maximum<br>  excluded Subtrees | USED ONLY WHEN THE SUBJECT IS CA (CA CERTIFICATION). | NONE BY DEFAULT |
| policy Constraints<br>  require Explicit Policy<br>  inhibit Policy Mapping | DESCRIBED HERE ARE CONSTRAINTS REQUIRING EXPLICIT POLICY IDs AND INHIBIT POLICY MAPPING FOR THE REMAINING CERTIFICATION PATHS. | |
| CRL Distribution Points | DESCRIBED HERE ARE POINTS AT WHICH THE USER REFERENCES THE CERTIFICATE REVOCATION LIST (CRL) TO SEE WHETHER THE CERTIFICATE IS REVOKED. | THESE POINTS SERVE AS POINTERS INDICATING WHERE THE CERTIFICATE IS REGISTERED. THE CERTIFICATE REVOCATION LIST IS MANAGED BY THE ISSUER. |
| SIGNATURE | ISSUER'S SIGNATURE | |

FIG.11

EXAMPLE OF RA MANAGEMENT DATABASE AT CA

| RA ID | USAGE OF MULTIPLE-SIGNATURE ALGORITHM | SIGNATURE ALGORITHM | KEY LENGTH | PARAMETERS | LOAD DISTRIBUTION | HSM IN USE |
|---|---|---|---|---|---|---|
| RA0001 | × | RSA | 1024 bits | — | × | 001 |
| RA0002 | × | RSA | 2048 bits | — | ○ | 002, 003, 004 |
| RA0003 | ○ | RSA | 512 bits | — | × | 005 |
| RA0003 | ○ | ECDSA | 160 bits | p=XX,... | × | 101 |
| RA0004 | ○ | RSA | 1024 bits | — | × | 006 |
| RA0004 | ○ | RSA | 2048 bits | — | × | 007 |
| RA0004 | ○ | ECDSA | 192 bits | p=YY,... | × | 102 |
| RA0004 | ○ | ECDSA | 224 bits | p=ZZ,... | × | 103 |

FIG. 12

VERIFICATION KEY DATABASE

| HSM ID | SIGNATURE ALGORITHM | KEY LENGTH | PARAMETERS | VERIFICATION KEY |
|---|---|---|---|---|
| 201 | RSA | 2048 bits | — | ◇⊤ |
| 201 | RSA | 1024 bits | — | ◆⊤ |
| 202 | ECDSA | 160 bits | p=XX,... | △⊤ |
| 202 | ECDSA | 192 bits | p=YY,... | ▲⊤ |

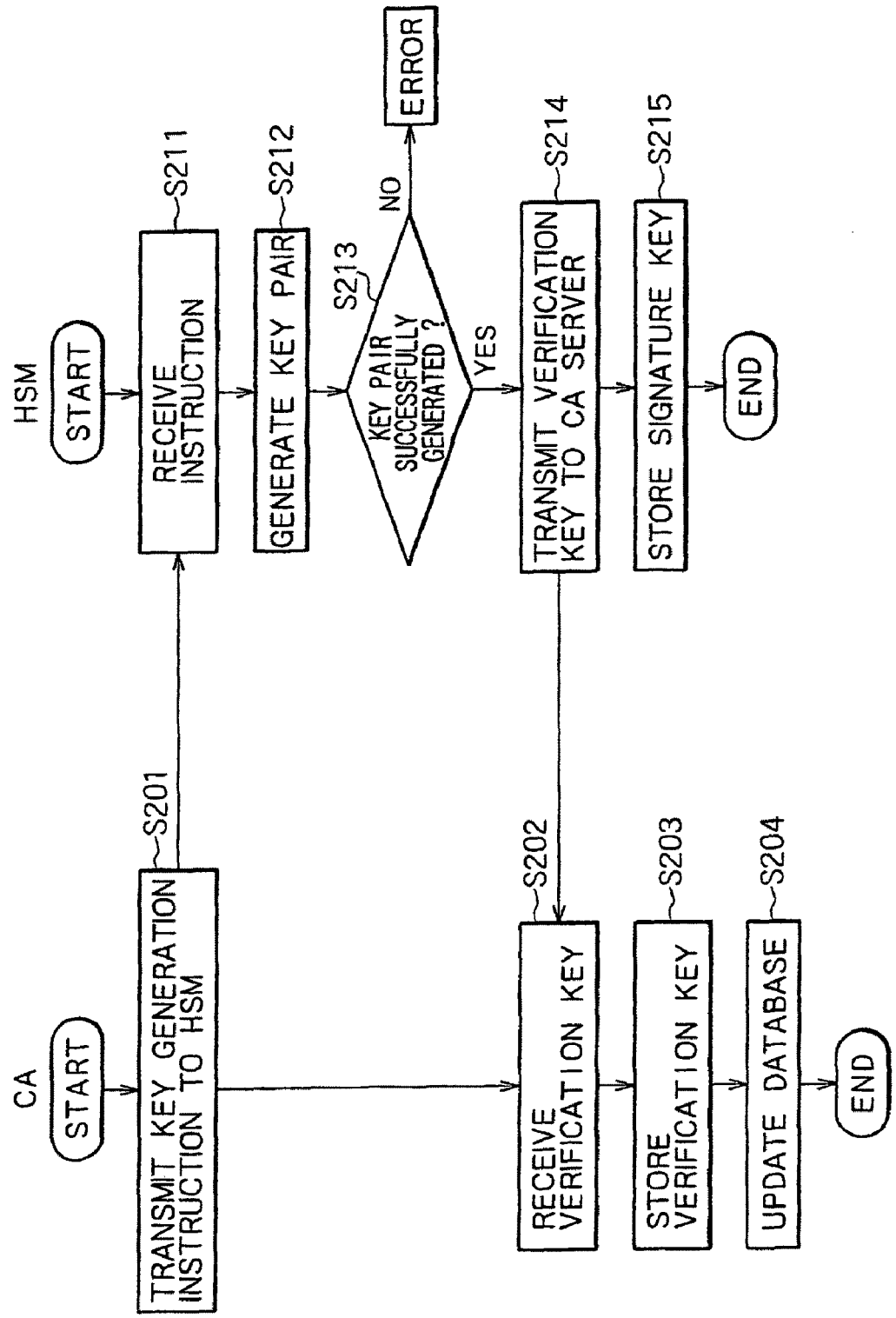

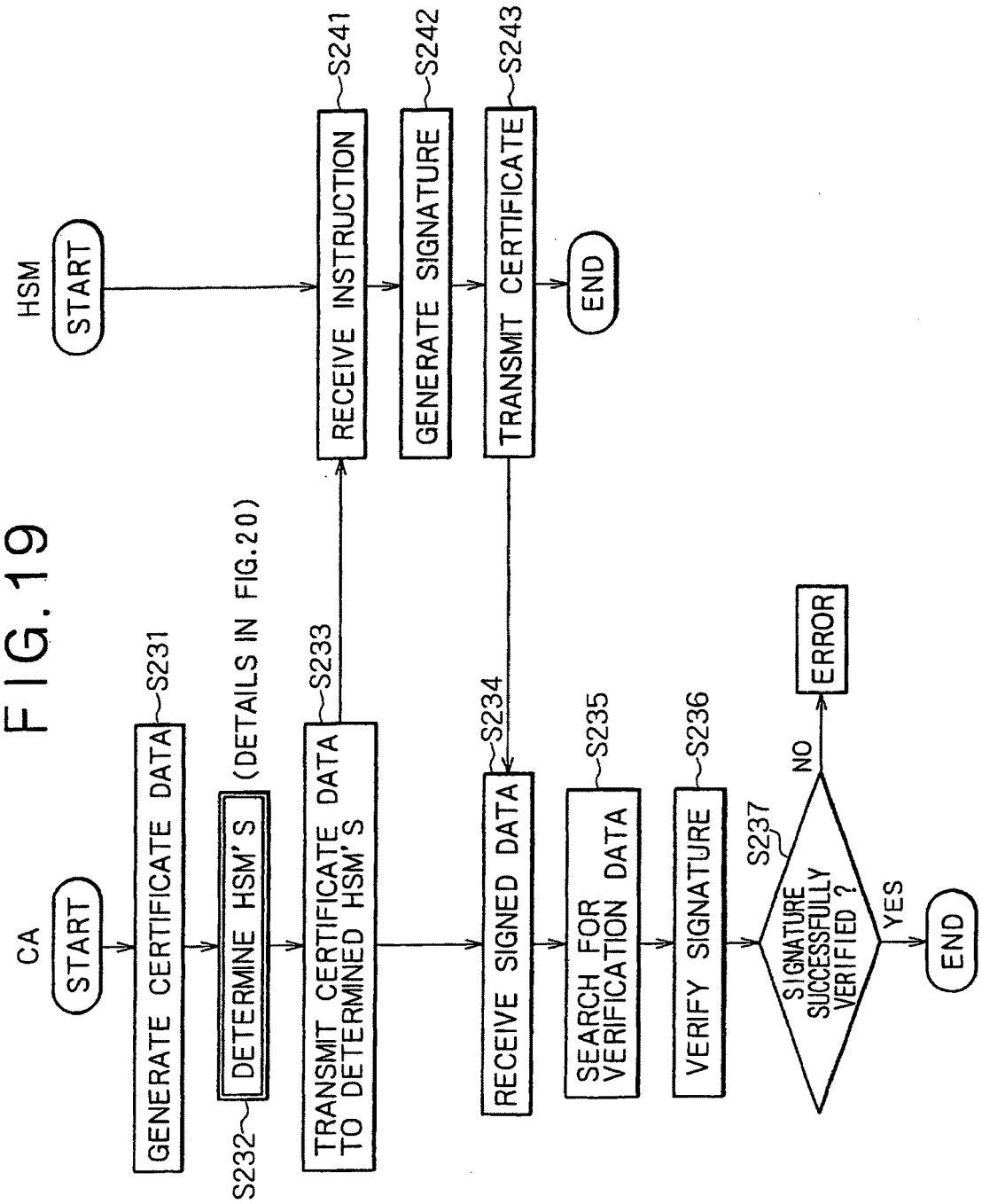

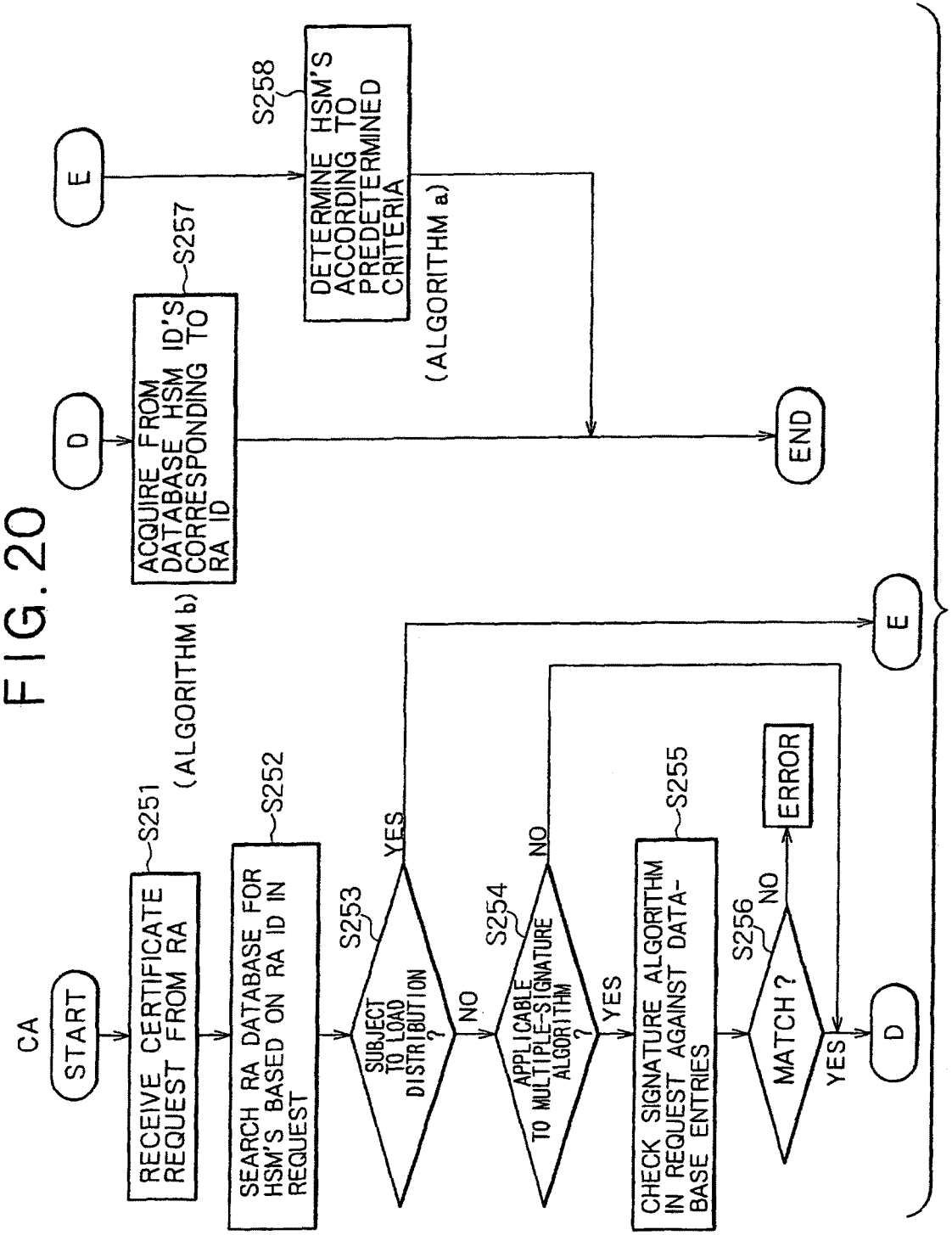

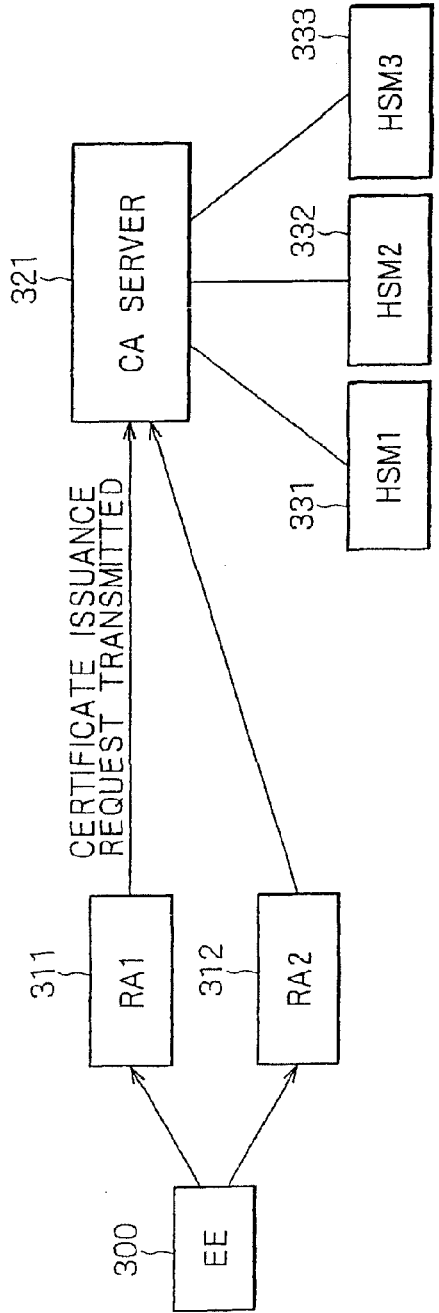

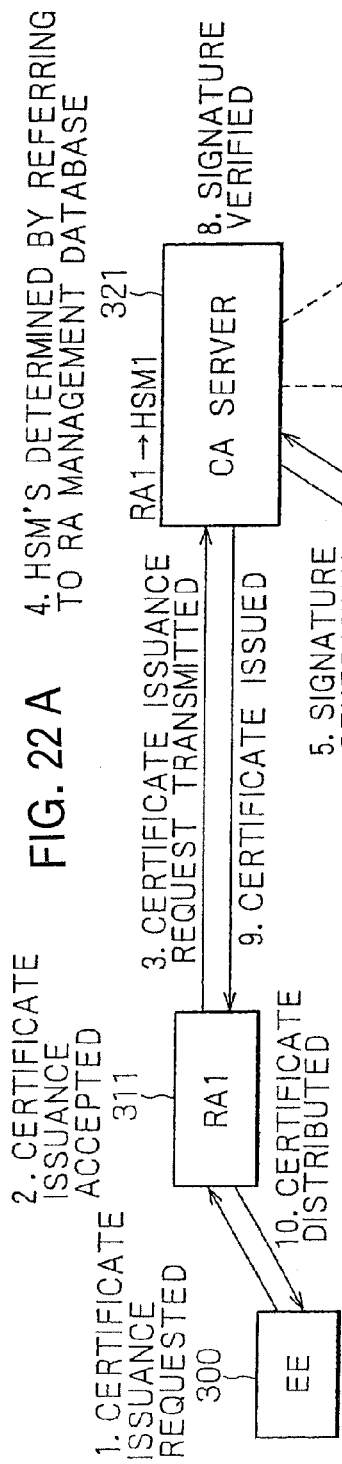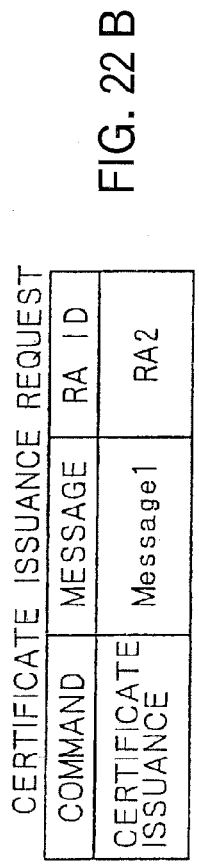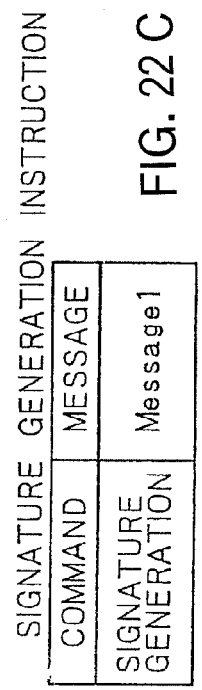

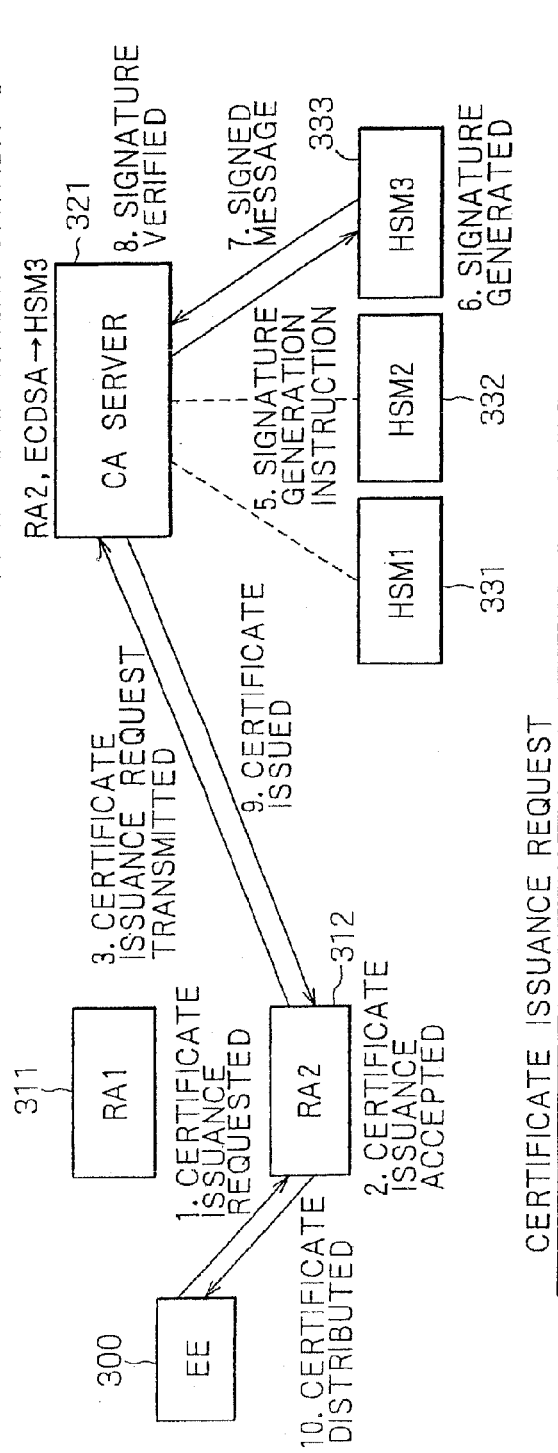

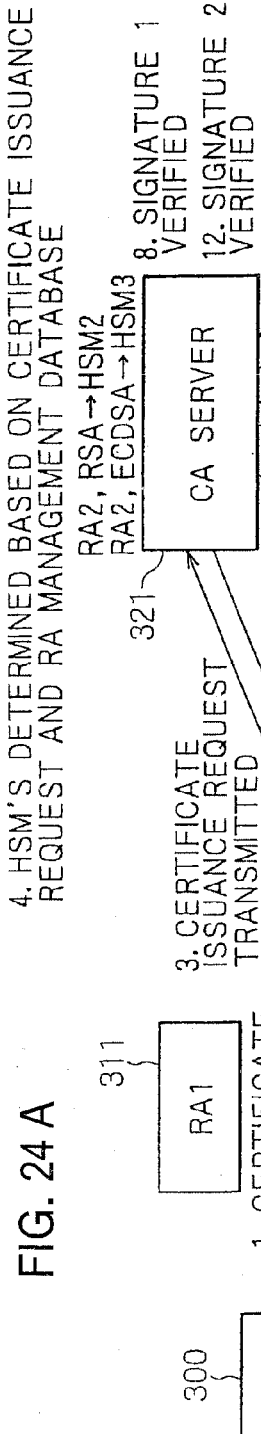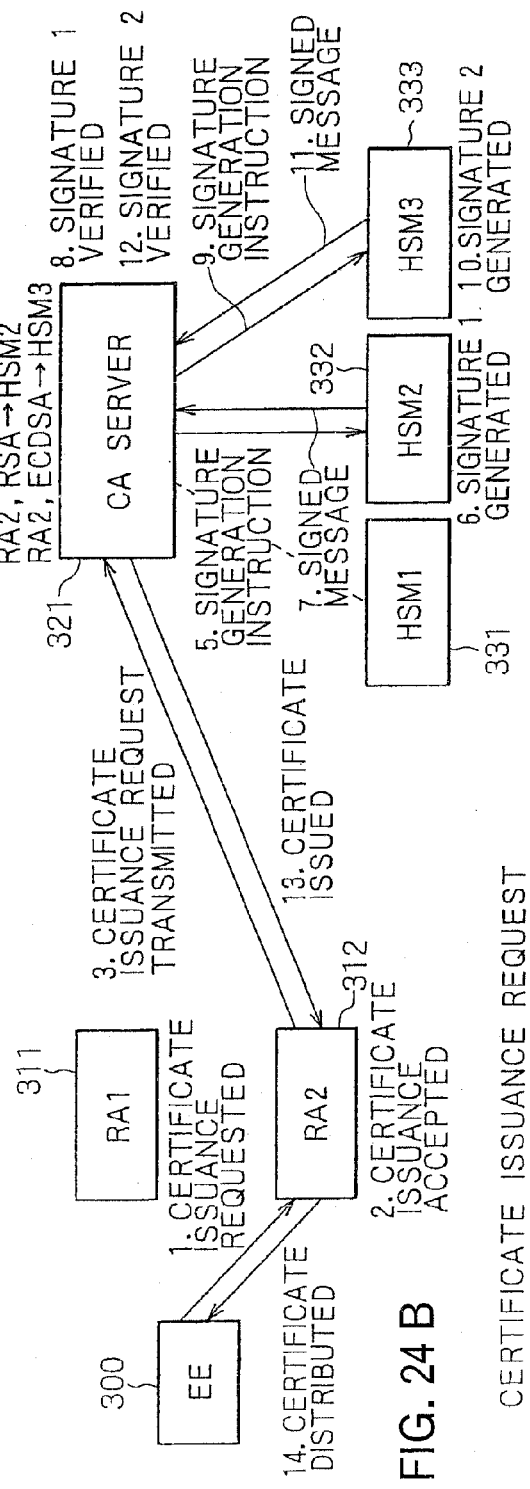
FIG. 24A
FIG. 24B
FIG. 24C
FIG. 24D

PUBLIC KEY CERTIFICATE ISSUING SYSTEM, PUBLIC KEY CERTIFICATE ISSUING METHOD, DIGITAL CERTIFICATION APPARATUS, AND PROGRAM STORAGE MEDIUM

CROSS REFERENCES TO RELATED APPLICATIONS

This is a Continuation application of U.S. patent application Ser. No. 10/041,964, filed Jan. 9, 2002, which is based on Japanese Application No.: P2001-002220, filed on Jan. 10, 2001, the entire contents of which are incorporated herein by reference.

BACKGROUND OF THE INVENTION

The present invention relates to a public key certificate issuing system, a public key certificate issuing method, a digital certification apparatus, and a program storage medium for processing the issuance of a public key certificate proving the validity of a public key used by an electronic delivery system in transmitting encrypted data. More particularly, the invention relates to a public key certificate issuing system, a public key certificate issuing method, a digital certification apparatus, and a program storage medium for use by a certificate authority (CA) that issues a public key certificate compatible with a plurality of signature algorithms, whereby entities utilizing such public key certificates are afforded enhanced convenience.

Today, diverse kinds of software data such as game program data, voice data, image data, and word-processing program data (generically called contents) are being exchanged over networks and particularly over the Internet. Electronic commerce is also on the increase, characterized by online shopping outlets and network-based merchandising schemes.

In such a network-based data communication environment, it is customary to ensure data security, i.e., to make sure that the transmitting and receiving sides are a legitimate party to each other before exchanging the necessary data. One representative technique for implementing data security during data transfer involves combining data encryption with signing of data.

Encrypted data are decrypted to plain text data by use of a predetermined procedure. Various methods for encrypting and decrypting information using an encryption key and a decryption key respectively have been known.

One of the diverse methods of data encryption and decryption based on encryption and decryption keys is so-called public key cryptosystem. This system involves a transmitting party having one key and a receiving party possessing another key, one of the keys being used as a public key for use by indefinite users, the other key being kept private. Illustratively, a data encryption key may be used as a public key and a decryption key as a private key. As another alternative, an authentication code generation key may be used as a private key and an authentication code decryption key as a public key.

Compared with so-called common key cryptosystem using a common key in both encryption and decryption, the public key cryptosystem is advantageous in terms of key management in that the private key need only be possessed by one particular person. Because of its lower data processing speed than the common key cryptosystem, the public key cryptosystem is more often utilized in applications involving limited amounts of data such as delivery of private keys and digital signatures. A representative example of the public key cryptosystem is RSA (Rivest-Shamir-Adleman) cryptosystem. The system uses a product of two very large prime numbers (e.g., of 150 digits each), taking advantage of the difficulty in factorizing the product of two large prime numbers into prime factors (and in obtaining the discrete logarithm of the product).

Another representative example of the public key cryptosystem is elliptic curve cryptography (ECC). This scheme capitalizes on the fact that computations can be defined between points on an elliptic curve whereby something similar to a discrete logarithmic problem (elliptic discrete logarithmic problem) can be created.

Whereas the RSA cryptosystem based on the factorization into prime factors is subject to sub-exponential decryption, elliptic discrete logarithmic problems can only be solved by exponential decryption. While the RSA cryptosystem has a key size of 512, 1,024 or 2,048 bits, schemes utilizing elliptic curve cryptography (ECC) such as elliptic curve digital signature algorithm (ECDSA) have a key size of as small as 160, 192 or 224 bits and still ensure the same degree of security as the RSA. Because of its reduced key size, the ECDSA provides a significantly high processing speed.

The public key cryptosystem is structured to offer public keys for use by an indefinite number of people. As such, the system most often utilizes what is known as a public key certificate proving that a distributed public key is valid. For example, suppose that a user A generates a key pair consisting of a public key and a private key and sends the generated public key to a certificate authority. In turn, the certificate authority sends back a public key certificate to the user A. The user A then discloses the public key certificate thus obtained to the public. An indefinite number of users go through a predetermined procedure to acquire the public key from the public key certificate, encrypt documents or other desired data using the acquired public key, and transmit what is encrypted to the user A. The user A decrypts the encrypted documents or data received using the previously generated private key. The user A also attaches signatures to the documents using the private key. The indefinite number of users go through the predetermined procedure to obtain the public key from the public key certificate and have the attached signatures verified.

The public key certificate will now be described by referring to FIG. 1. The public key certificate is a certificate issued by a certificate authority (CA; also called an issuing authority or IA) on public key cryptosystem. When a user submits his ID and a public key to be included into a certificate, the certificate authority completes the certificate by furnishing it with a signature.

A typical public key certificate shown in FIG. 1 includes: a certificate version number; a serial number allocated to a certificate user by a certificate authority (CA); algorithm and parameters used for signature by the RSA, ECDSA, etc.; a certificate authority name; the period of certificate validity; the certificate user's name (user ID); the user's public key; and a digital signature.

The digital signature is generated to attest the whole range of certified items: certificate version number, certificate authority serial number, signature algorithm and parameters, certificate authority name, certificate validity, user ID, and user's public key. Illustratively, a hash value is generated using hash function, and the certificate authority's private key is applied to the hash value to generate the signature.

The certificate authority issues public key certificates such as the one shown in FIG. 1, updates expired public key certificates; and creates, manages and distributes a certificate revocation list that repudiates unscrupulous users. The certificate authority also generates public and private keys as needed.

When utilizing a public key certificate, a user gets a digital signature on his public key certificate verified using a certificate authority's public key in his possession. After the successful verification of the digital signature, the user utilizes the public key by extracting it from the public key certificate. It follows that all users employing public key certificates must have a common public key of the certificate authority.

A data transmission system may include a public key cryptosystem like the above-described scheme using public key certificates issued by the certificate authority. In that setup, the system allows each user to have the digital signature of his public key certificate verified and to extract the public key from the public key certificate after the successful signature verification. The user is then allowed to carry out a certification process based on the public key cryptosystem or to encrypt or decrypt outgoing or incoming data using the cryptosystem. The problem is that end entities such as user devices performing various processes based on the public key cryptosystem are rarely compatible with all of such diverse encryption algorithms as the ECDSA, RSA and others. In most cases, each entity is capable of dealing with only one algorithm (ECDSA algorithm or RSA algorithm in particular).

Such devices each compatible with only a specific encryption algorithm can only be used with public key certificates based on that algorithm alone. Public key certificates signed by use of any other algorithm cannot be verified upon receipt.

One of the challenges to be addressed in establishing a certificate authority (CA) is how to store private keys as signature keys while ensuring security in providing signatures. Another challenge is how to improve the speed of signature computation, which is conducive to boosting system performance of the certificate authority. One way to ensure signature security and boost computing speed is by resorting to dedicated hardware (HSM: hardware security modules) for signature key (private key) storage and signature provision. Highly tamper-resistant, HSMs play a significant role in enhancing the level of security. At present, there are systems utilizing HSMs but none of them is compatible with multiple different signature algorithms. Hence the growing need for the certificate authority (CA) to accommodate a plurality of signature algorithms.

Conventionally, as shown in FIG. 2, an ECDSA end entity (device) 23 (compatible with the ECDSA algorithm) requests an ECDSA registration authority (ECDSA-RA) 22 (performing a signature process based on the ECDSA algorithm) to issue or update a public key certificate. The ECDSA registration authority 22 certifies entities or devices taking part in various services, receives public key certificate issuance requests from these entities or devices, and forwards the requests to an ECDSA certificate authority (ECDSA-CA) 21 that performs a signature process based on the ECDSA algorithm. In turn, the ECDSA certificate authority 21 issues public key certificates based on the signature process using the ECDSA algorithm, and distributes the certificates to the ECDSA end entities 23 via the ECDSA registration authority 22.

On the other hand, an RSA end entity (device) 33 (compatible with the RSA algorithm) requests an RSA registration authority (RSA-RA) 32 (performing a signature process by use of the RSA algorithm) to issue or update a public key certificate. The RSA registration authority 32 certifies entities or devices participating in diverse services, receives public key certificate issuance requests from these entities or devices, and forwards the requests to an RSA certificate authority (RSA-CA) 31 that performs a signature process based on the RSA algorithm. In turn, the RSA certificate authority 31 issues public key certificates based on the signature process using the RSA algorithm, and distributes the certificates to the RSA end entities 33 via the RSA registration authority 32.

As described, two (or more) different processing blocks are established to deal with two different signature algorithms. Each processing block constitutes a closed system wherein a public key cryptosystem specific to that block alone is used to effect certification and transmit encrypted data.

The ECDSA end entity 23 is incapable of verifying a public key certificate received from the RSA device 33 with a signature in RSA algorithm. The received public key certificate will not serve as a certificate as long as its validity is not established. Conversely, the RSA end entity 33 cannot verify a public key certificate received from the ECDSA end entity 23 with a signature in ECDSA algorithm; the validity of the public key certificate remains uncertain following its receipt.

If the ECDSA end entity 23 and RSA end entity 33 in FIG. 2 were to verify the validity of a public key certificate coming from the other party, each party must resort to a circuitous validation procedure: the received public key certificates are first transmitted respectively to the ECDSA registration authority 22 and RSA registration authority 32, and forwarded from there to the ECDSA certificate authority 21 and RSA certificate authority 31. The ECDSA certificate authority 21 and RSA certificate authority 31 then exchange queries about the respective certificates. The results of the queries are sent back finally to the respective end entities for certification purposes.

It is therefore an object of the present invention to overcome the above and other deficiencies of the related art, particularly of data communication systems based on the public key cryptosystem dealing with public key certificates, and to provide a public key certificate issuing system, a public key certificate issuing method, a digital certification apparatus, and a program storage medium for allowing a single certificate authority to support a plurality of encryption algorithms and to issue a public key certificate with signatures in different algorithms so that devices each compatible with a particular encryption algorithm alone, such as ECDSA end entities or RSA end entities, may effectively utilize the public key certificate from one another for cross-certification and data communication therebetween.

SUMMARY OF THE INVENTION

In carrying out the invention and according to a first aspect thereof, there is provided a public key certificate issuing system including: a certificate authority for issuing a public key certificate used by an entity; and a registration authority which, on receiving a public key certificate issuance request from any one of entities under jurisdiction thereof, transmits the received request to the certificate authority; wherein the certificate authority, having a plurality of signature modules each executing a different signature algorithm, selects at least one of the plurality of signature modules in accordance with the public key certificate issuance request from the registration authority, and causes the selected signature module to attach a digital signature to message data constituting a public key certificate.

In one preferred structure according to the first aspect of the invention, the certificate authority may have a plurality of signature modules and a certificate authority server for outputting a signature processing request to the plurality of signature modules; the certificate authority server may receive the public key certificate issuance request from the registration authority, select at least one of the plurality of signature modules in response to the public key certificate issuance request, and output the signature processing request to the selected signature module; and each of the plurality of signature modules may attach a digital signature to the message data constituting the public key certificate in response to the signature processing request received from the certificate authority server.

In another preferred structure of the invention, the certificate authority may have a registration authority management database which stores registration authority management data for associating registration authorities issuing public key certificate issuance requests with a signature algorithm specific to each of the registration authorities; and given a public key certificate issuance request from any registration authority, the certificate authority may select the signature module associated with the relevant signature algorithm based on the registration authority management data.

According to a further preferred structure of the invention, the registration authority management data may include key length and parameter information applicable to signatures.

In an even further preferred structure of the invention, the registration authority management data may include signature module identification information applicable to signatures.

In a still further preferred structure of the invention, the registration authority may transmit signature algorithm designation information along with the public key certificate issuance request to the certificate authority; and the certificate authority, based on the signature algorithm designation information received along with the public key certificate issuance request, may select a signature module applicable to the designated signature algorithm.

In a yet further preferred structure of the invention, the signature algorithm designation information may include key length and parameter information applicable to signatures.

In another preferred structure of the invention, the certificate authority may have a verification key database which stores keys for signature verification in association with each of the plurality of signature modules; and the certificate authority may verify signatures generated by each of the plurality of signature modules.

In a further preferred structure of the invention, the certificate authority may use at least two of the plurality of signature modules to attach at least two different digital signatures to one public key certificate.

In an even further preferred structure of the invention, the certificate authority may select at least two of the plurality of signature modules in order to have signature processing executed in steps by each of the selected signature modules used in concert for digital signature generation.

In a still further preferred structure of the invention, the certificate authority and the registration authority may each have a signature module structure management table which associates signature algorithm identifiers with identifiers of the plurality of signature modules; the registration authority may issue to the certificate authority a public key certificate issuance request designating a signature algorithm identifier in accordance with the signature module structure management table; and the certificate authority, upon receipt of the signature algorithm identifier from the registration authority, may select the signature module applicable to the received identifier from the signature module structure management table.

In a yet further preferred structure of the invention, at least part of the plurality of signature modules may have a common signature key stored therein.

In another preferred structure of the invention, a plurality of signature algorithms may be executed by each of the plurality of signature modules.

According to a second aspect of the invention, there is provided a public key certificate issuing method for use with a certificate authority for issuing a public key certificate used by an entity, and with a registration authority which, on receiving a public key certificate issuance request from any one of entities under jurisdiction thereof, transmits the received request to the certificate authority, the method comprising the steps of: causing the certificate authority selects, from among a plurality of signature modules each executing a different signature algorithm, at least one of the signature modules in accordance with the public key certificate issuance request from the registration authority; and causing the selected signature module to attach a digital signature to message data constituting a public key certificate.

In one preferred variation according to the second aspect of the invention, the public key certificate issuing method may further comprise the steps of: causing a certificate authority server to receive a public key certificate issuance request from the registration authority; causing the certificate authority server to select at least one of the plurality of signature modules in response to the public key certificate issuance request; and causing the certificate authority server to output a signature processing request to the selected signature module.

In another preferred variation of the invention, the step involving the certificate authority server selecting the signature module may include selecting the signature module based on a registration authority management database which stores registration authority management data for associating registration authorities issuing public key certificate issuance requests with a signature algorithm specific to each of the registration authorities.

In a further preferred variation of the invention, the step involving the certificate authority server selecting the signature module may include selecting the signature module based on signature algorithm designation information received along with the public key certificate issuance request.

In an even further preferred variation of the invention, the public key certificate issuing method may further include the step of causing the certificate authority to verify signatures generated by each of the plurality of signature modules.

In a still further preferred variation of the invention, the public key certificate issuing method may further include the step of causing the certificate authority to use at least two of the plurality of signature modules to attach at least two different digital signatures to one public key certificate.

In a yet further preferred variation of the invention, the public key certificate issuing method may further include the step of causing the certificate authority to select at least two of the plurality of signature modules in order to have signature processing executed in steps by each of the selected signature modules used in concert for digital signature generation.

In another preferred variation of the invention, the certificate authority and the registration authority may each have a signature module structure management table which associates signature algorithm identifiers with identifiers of the plurality of signature modules, and the public key certificate issuing method may further comprise the steps of: causing the registration authority to issue to the certificate authority a public key certificate issuance request designating a signature algorithm identifier in accordance with the signature module structure management table; and causing the certificate authority, upon receipt of the signature algorithm identifier from the registration authority, to select the signature module applicable to the received identifier from the signature module structure management table.

In a further preferred variation of the invention, the public key certificate issuing method may further comprise the step of having a plurality of signature algorithms executed by each of the plurality of signature modules.

According to a third aspect of the invention, there is provided a digital certification apparatus for constituting a certificate authority which issues a public key certificate used by an entity: wherein the digital certification apparatus, having a plurality of signature modules each executing a different signature algorithm, selects at least one of the plurality of signature modules in accordance with a public key certificate issuance request received from outside, and causes the selected signature module to attach a digital signature to message data constituting a public key certificate.

In one preferred structure according to the third aspect of the invention, the digital certification apparatus may further comprise a plurality of signature modules and a certificate authority server for outputting a signature processing request to the plurality of signature modules; wherein the certification authority may receive the public key certificate issuance request, select at least one of the plurality of signature modules in response to the public key certificate issuance request, and output the signature processing request to the selected signature module; and wherein each of the plurality of signature modules may attach a digital signature to the message data constituting the public key certificate in response to the signature processing request received from the certificate authority server.

In another preferred structure of the invention, the digital certification apparatus may further comprise a registration authority management database which stores registration authority management data for associating registration authorities issuing public key certificate issuance requests with a signature algorithm specific to each of the registration authorities; wherein, given a public key certificate issuance request from any registration authority, the digital certification apparatus may select the signature module associated with the relevant signature algorithm based on the registration authority management data.

In a further preferred structure of the invention, the registration authority management data may include key length and parameter information applicable to signatures.

In an even further preferred structure of the invention, the registration authority management data may include signature module identification information applicable to signatures.

In a still further preferred structure of the invention, the digital certification apparatus may, based on signature algorithm designation information received along with the public key certificate issuance request, select a signature module applicable to the designated signature algorithm.

In a yet further preferred structure of the invention, the signature algorithm designation information may include key length and parameter information applicable to signatures.

In another preferred structure of the invention, the digital certification apparatus may further comprise a verification key database which stores keys for signature verification in association with each of the plurality of signature modules; wherein the digital certification apparatus may verify signatures generated by each of the plurality of signature modules.

In a further preferred structure of the invention, the digital certification apparatus may use at least two of the plurality of signature modules to attach at least two different digital signatures to one public key certificate.

In an even further preferred structure of the invention, the digital certification apparatus may select at least two of the plurality of signature modules in order to have signature processing executed in steps by each of the selected signature modules used in concert for digital signature generation.

In a still further preferred structure of the invention, the digital certification apparatus may further comprise a signature module structure management table which associates signature algorithm identifiers with identifiers of the plurality of signature modules; wherein the digital certification apparatus may, upon receipt of a signature algorithm identifier along with the public key certificate issuance request, select the signature module applicable to the received identifier from the signature module structure management table.

In a yet further preferred structure of the invention, at least part of the plurality of signature modules may have a common signature key stored therein.

In another preferred structure of the invention, a plurality of signature algorithms may be executed by each of the plurality of signature modules.

According to a fourth aspect of the invention, there is provided a program storage medium which stores a computer program executed by a computer system in carrying out public key certificate issuance processing to issue a public key certificate for use by an entity, the computer program comprising the steps of: selecting, from among a plurality of signature modules each executing a different signature algorithm, at least one of the signature modules in accordance with a public key certificate issuance request; and causing the selected signature module to attach a digital signature to message data constituting a public key certificate.

The program storage medium according to the fourth aspect of the invention is a medium that offers a computer program in computer-readable format for use on a general-purpose computer capable of executing diverse program codes. The medium may be any one of such storage media as CDs (compact discs), FDs (floppy discs) and MOs (magneto-optical discs); or of transmission media such as networks, and others.

The above type of program storage medium retains definitions of structural or functional relations of cooperation between the medium carrying the computer program on the one hand, and the computer program for implementing necessary computer program functions on the computer system on the other hand. That is, once the computer program is installed into the computer system by means of the program-carrying medium, the computer system performs cooperative operations based on the program providing the same effects as those of the other aspects of the present invention.

Other objects, features and advantages of the invention will become more apparent upon a reading of the following description and appended drawings.

BRIEF DESCRIPTION OF THE DRAWINGS

FIG. 2 is a schematic view outlining a conventional public key certificate issuing system;

FIG. 4 is a tabular view detailing a data structure of a public key certificate;

FIG. 5 is another tabular view detailing the data structure of the public key certificate;

FIG. 11 is a tabular view depicting a typical structure of a registration authority (RA) management database owned by the certificate authority server;

FIG. 12 is a tabular view indicating a typical structure of a verification key database owned by the certificate authority server;

FIG. 18 is a flowchart of steps constituting the process of storing a signature key into a signature module;

FIG. 19 is a flowchart of steps constituting a signature process performed by a signature module using a signature key;

FIG. 20 is a flowchart of steps constituting a signature module determining process performed by a signature module during signature process execution;

FIGS. 21A-C are schematic views for explaining a typical signature process performed by signature modules (as example 1);

FIGS. 22 A-C are schematic views for explaining another typical signature process performed by signature modules (as example 2);

FIGS. 23 A-C are schematic views for explaining another typical signature process performed by signature modules (as example 3);

FIGS. 24 A-D are schematic views for explaining another typical signature process performed by signature modules (as example 4);

DESCRIPTION OF THE PREFERRED EMBODIMENTS

Preferred embodiments of this invention will now be described in detail by referring to the accompanying drawings. Major terms used in the ensuing description are defined below.

A certificate authority (CA) is an organ that creates and issues public key certificates.

A registration authority (RA) is an organ that performs registration work for issuing public key certificates. The registration authority is requested to issue a public key certificate by a user, a service provider, a server or other party (called an end entity, to be defined later) desirous of utilizing a public key certificate. In turn, the registration authority sends a public key certificate issuance request to the certificate authority. In response to the request, the certificate authority issues a public key certificate to the registration authority which then forwards the certificate to the requesting party.

A hardware security module (HSM) is a piece of dedicated hardware for retaining a signature key and attaching it to a certificate.

An end entity (EE) is a subject to which a public key certificate is issued. As such, the end entity may be a device, a server, a user, a service provider, or any other entity utilizing the certificate.

[Certificate Authority (CA) Having a Plurality of Signature Modules]

Described below is a typical structure of a certificate authority (CA) acting as a digital certification apparatus that possesses a plurality of signature modules. One of the challenges in establishing the certificate authority is how to store private keys securely in a system based on a public key cryptosystem while ensuring security in providing signatures. Another challenge is how to improve the computing speed of signature provision, which is conducive to boosting system performance of the certificate authority.

One way to ensure signature security and boost computing speed is by utilizing dedicated hardware (hardware security modules) for signature key (private key) storage and signature provision. Highly tamper-resistant, the HSM plays a significant role in enhancing the level of security. However, encryption algorithms executed by individual HSMs are fixed and cannot be altered in any way.

The inventive system comprises a certificate authority (CA) capable of accommodating a plurality of different signature algorithms, key lengths and parameters. More specifically, the certificate authority is structured to include a plurality of signature modules implemented either by dedicated hardware (HSM) or by software executing different signature algorithms.

Figure 1:
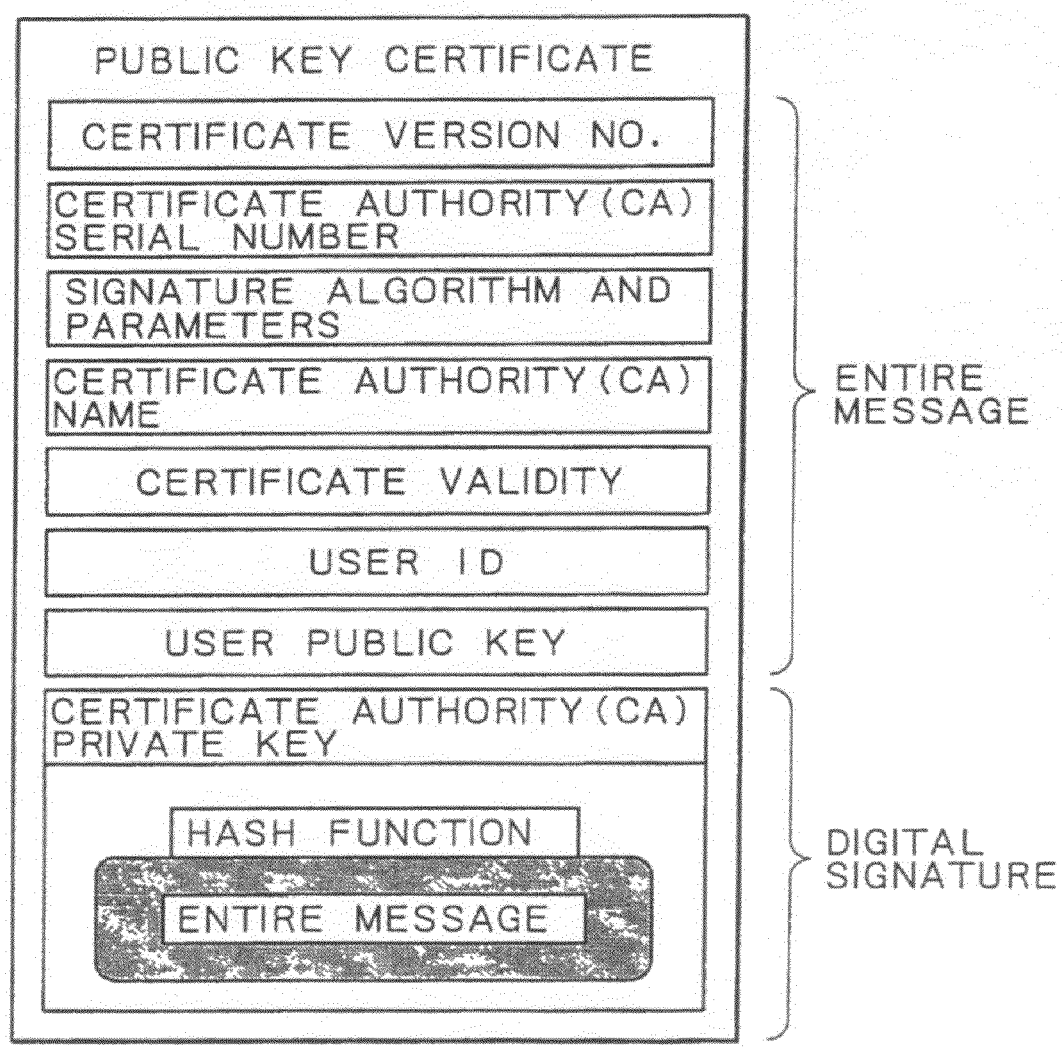
FIG. 1 is a schematic view of a typical public key certificate.
Figure 3:
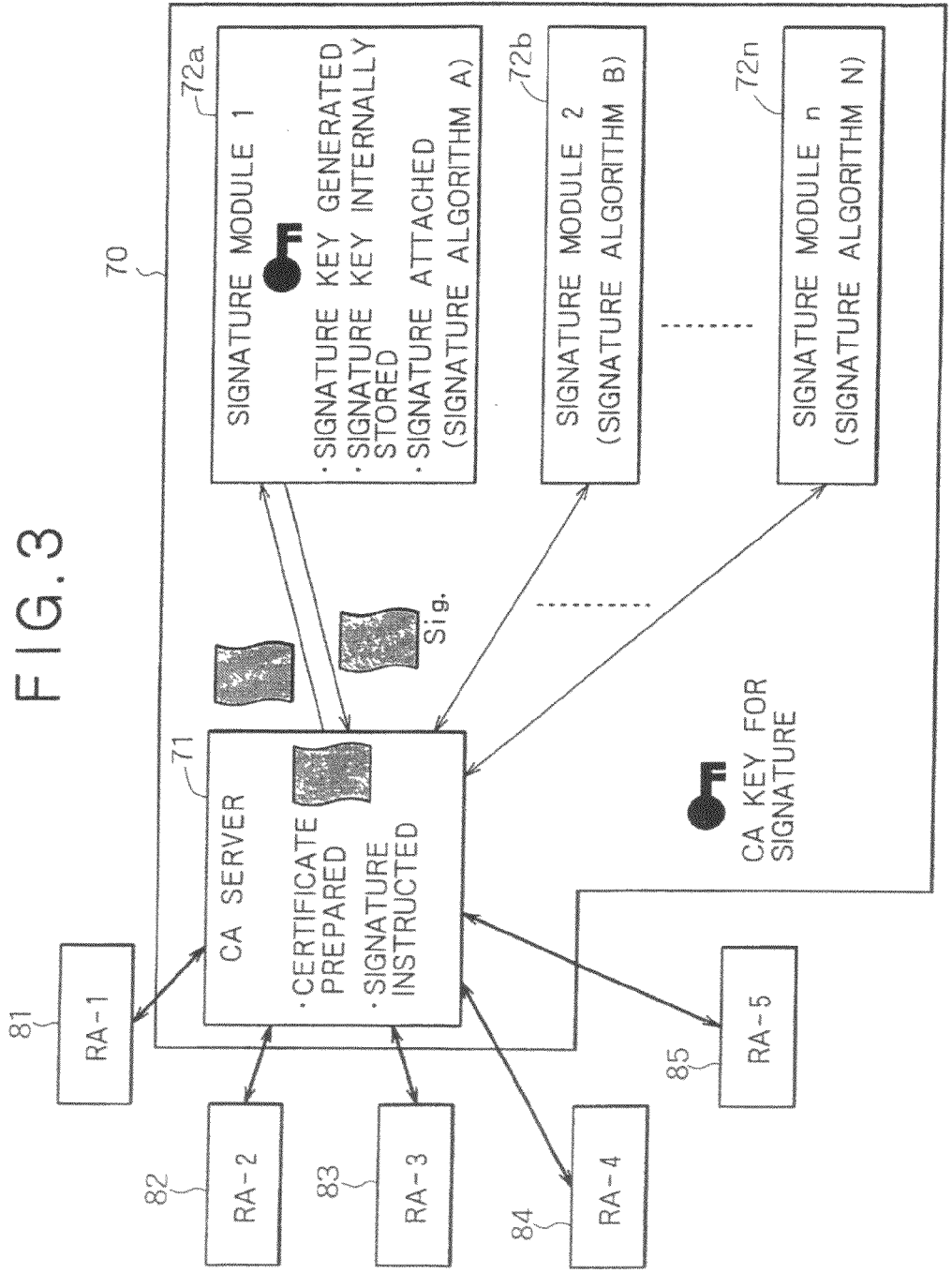
FIG. 3 is a schematic view outlining a public key certificate issuing system according to this invention.

FIG. 3 is a schematic view showing how a certificate authority acting as a digital certification apparatus (CA) comprising a plurality of signature modules typically operates. In FIG. 3, a CA server 71 in a certificate authority 70 receives via registration authorities (RA) 81 through 85 a public key certificate issuance request sent from any one of various end entities (EE) such as servers, users and service providers wishing to utilize a public key certificate.

The registration authorities 81 through 85 each have a specific signature algorithm such as Rivest-Shamir-Adleman (RSA) cryptosystem or elliptic curve cryptography (ECC) ready to be applied to a public key certificate that may be issued for use by end entities (EE) under jurisdiction of the registration authority in question. Of the signature algorithms thus furnished, one or more algorithms are selectively designated in a public key certificate issuance request bound for the certificate authority 70. The request with a specific signature algorithm designated therein requires having a signature executed in the specified algorithm. Given such a request from an end entity, one of the registration authorities (RA) 81 through 85 forwards the request to the certificate authority 70, calling on the latter to issue a public key certificate with the signature in the specified encryption algorithm. The public key certificate thus issued is sent to and subsequently verified by the end entity in question. The applicable signature algorithm varies from one registration authority to another.

Public key certificate issuance requests from registration authorities are accepted by the CA server 71 in the certificate authority (CA) 70. In turn, the CA server 71 selects some of signature modules 72a through 72n in accordance with a table that associates each of the registration authorities (RA) 81 through 85 owned by the CA server 71 with a specific signature algorithm. When the necessary signature modules are selected from the table, the CA server 71 generates public key certificates and sends them to the selected modules along with a signature execution instruction each.

Upon receipt of the public key certificates along with the signature execution instruction, the signature modules in question carry out their respective signature processes using the applicable signature algorithms (e.g., RSA, ECDSA). The signed public key certificates are returned to the CA server 71. The CA server 71, on receiving the signed public key certificates from the modules involved, forwards the certificates to the requesting registration authorities (RA) 81 through 85.

Each of the signature modules 72a through 72n either receives externally or generates internally a certificate authority signature key in accordance with a particular signature algorithm for signature execution. The signature modules 72a through 72n each comprise a hardware security module (HSM), i.e., a dedicated piece of hardware for signature execution; or a dedicated processor or CPU for carrying out a signature by use of a program capable of executing the applicable signature algorithm. Tamper-resistant, the signature modules 72a through 72n use signature keys to sign messages based on the components of a public key certificate generated by the CA server 71. In the description that follows, the HSM constituting a processing unit comprising a signature module may be replaced either by a dedicated processor for executing a signature using a program capable of executing the relevant signature algorithm, or by a CPU-equipped module carrying out a software-based signature process.

Typical signature processes performed by the signature modules 72a through 72n include Rivest-Shamir-Adleman (RSA) cryptosystem and elliptic curve digital signature algorithm (ECDSA). With each cryptosystem, different key lengths entail different computing speeds and afford different levels of security. The most-often utilized key lengths are 512 bits, 1,024 bits or 2,048 bits for the RSA cryptosystem; and 160 bits, 192 bits or 224 bits for the ECDSA. With the ECDSA in effect, the signature algorithm is determined and the level of security is varied by an elliptic curve $y^2=X^3+ax+b$ in a field $F(p)$ (p is a prime number or 2 to an n-th power) together with characteristic "p," orders "r, a" and "b"; and by a base point (Gx, Gy) on the curve. This signature algorithm will be described later in more detail.

[Public Key Certificate]

A public key certificate is issued by a third party called a certificate authority (CA) attesting to the validity of a public key for use by two parties for cross-certification in exchanging data or encryption data therebetween. A typical format of the public key certificate adopted by the inventive system is described below in detail by referring to FIGS. 4 and 5. The format example shown in FIGS. 4 and 5 is based on the public key certificate format X.509, V3.

In the format shown in FIG. 4, a "version" field indicates the version of the certificate format in use.

A "serial number" field accommodates a serial number attached to a public key certificate by the certificate authority (CA).

A "signature algorithm identifier—algorithm, parameters" field records a signature algorithm and algorithm parameters used in the public key certificate in question. The signature algorithm is typically elliptic curve cryptography (ECC), RSA, or others. If the ECC is in effect, parameters and a key length are recorded; if the RSA is in use, then a key length is recorded. If any other cryptosystem is adopted, the identifier of that cryptosystem is recorded in this field.

An "issuer" field records as a distinguished name the name of a public key certificate issuer, i.e., of the certificate authority (CA) in effect.

A "validity—not before, not after" field accommodates a starting date and time (Not Before) as well as an ending date and time (Not After).

A "subject" field records the name of a subject, i.e., of a user who utilizes the certificate. Specifically, the subject may be represented by the ID of a user device or of a service offering entity.

A "subject public key information-algorithm, subject public key" field contains a key algorithm as the user's public key information, and key information itself.

The fields explained so far are included in the public key certificate format X.509, V1. The fields to be described below are those added to the public key certificate format X.509, V3.

An "authority key identifier—key identifier, authority certificate issuer, authority certificate serial number" field contains information for identifying a certificate authority (CA) key. A key identifier (octal number), the name of the certificate authority, and a certificate serial number are recorded in this field.

A "subject key identifier" field accommodates identifiers for identifying a plurality of keys for use in a public key certificate.

A "key usage" field designates the purpose of key usage selected from among the following: (0) for digital signature, (1) for repudiation prevention, (2) for key encryption, (3) for message encryption, (4) for distribution of a common key, (5) for verification of a certificate signature, or (6) for verification of a signature on a certificate revocation list.

A "private key usage period—not before, not after" field records the usage period of a private key owned by the user.

A "certificate policies" field records certificate issuance policies applicable to the certificate authority (CA) and registration authority (RA) in question. For example, IDs of certification policies based on the ISO/IEC 9384-1 are recorded in this field.

A "policy mappings—issuer domain policy, subject domain policy" field is used only when the certificate authority needs to be certified. The field records mappings regarding the policy of the certificate authority as a certificate issuer, and the policy of the subject.

A "supported algorithms—algorithm identifier, intended usage, intended certificate policies" field defines attributes of a directory (X.500). Where the opposite party of communication is to use directory information, definitions in this field inform that party of the directory attributes in advance.

A "subject alternative name" field records an alternative name of the user.

An "issuer alternative name" field records an alternative name of the certificate issuer.

A "subject directory attributes" field accommodates any attributes of the user.

A "basic constraints—CA, path length constraint" field is used to specify whether the public key subject to certification is to be used for signature by the certificate authority (CA) or by the user.

A "name constraints—permitted subtrees, base, minimum, maximum, excluded subtrees" field indicates effective domains of a certificate used only when the subject is the certificate authority.

A "policy constraints—require explicit policy, inhibit policy mapping" field describes constraints requiring explicit policy IDs and inhibit policy mapping for the remaining certification paths.

A "CRL (certificate revocation list) distribution points" field describes points at which the user, upon utilizing a certificate, references a certificate revocation list (CRL) to see whether the certificate is revoked.

A "signature" field contains the signature of the certificate authority (CA).

[Signature Algorithms]

The above signature attached to a public key certificate is a digital signature executed onto data constituting the certificate through the use of a private key issued by a public key certificate issuer (certificate authority or CA). By utilizing a public key issued by the certificate authority, the user of a public key certificate is able to check whether the certificate has been tampered with.

A digital signature algorithm based on elliptic curve cryptography (ECC) is described below with reference to FIG. 6. The flowchart of steps in FIG. 6 constitutes the process of generating digital signature data by use of ECDSA (elliptic curve digital signature algorithm (IEEE P1363/D3)).

Figure 6:
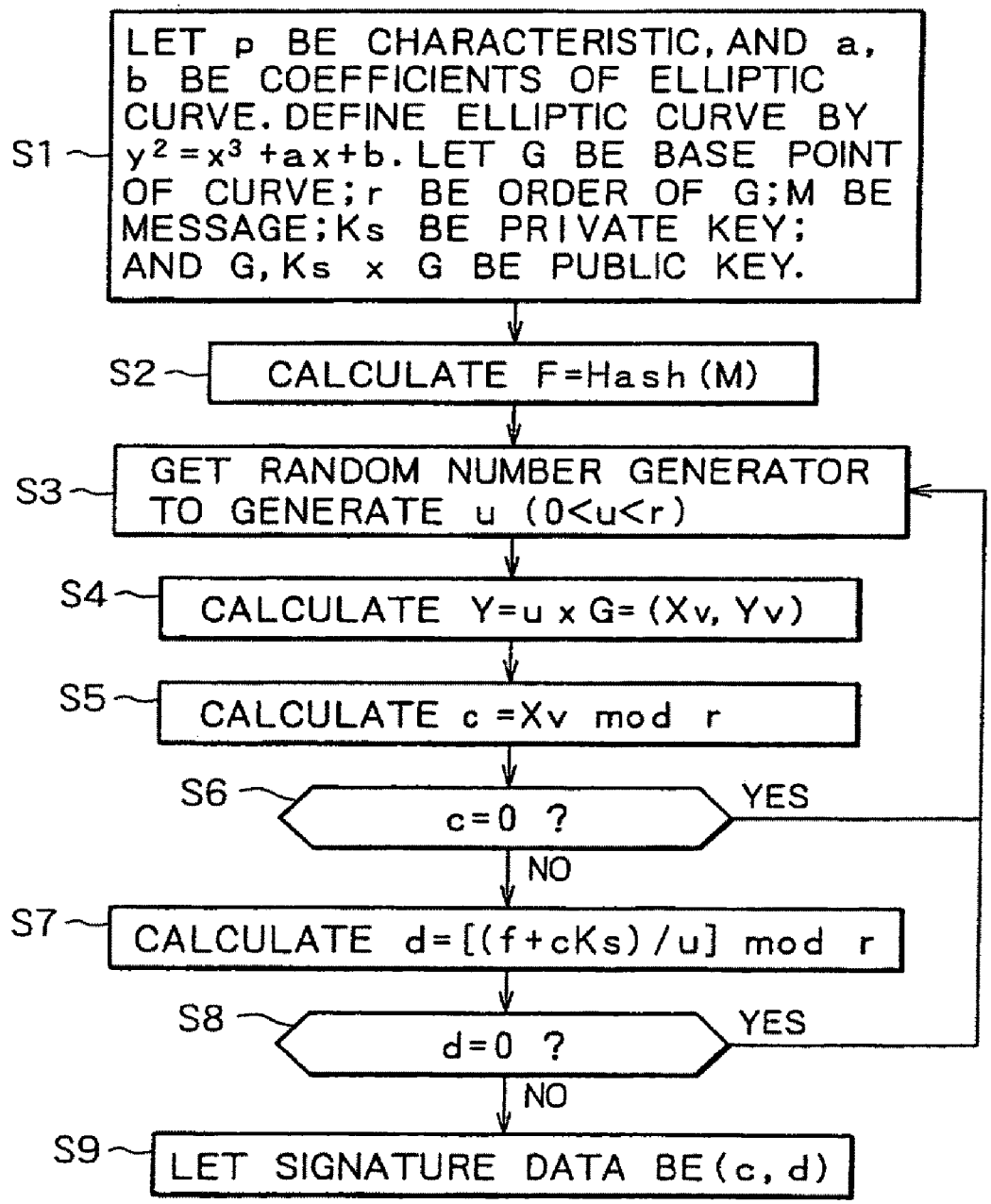
FIG. 6 is a flowchart of steps constituting an ECDSA signature generation process.

Each of the steps in FIG. 6 will now described. In step S1, it is assumed that "p" represents a characteristic; that "a" and "b" denote coefficients of an elliptic curve ($4a^3+27b^2 \neq 0 \pmod{p}$); and that "G" stands for a base point on the elliptic curve, "r" for the order of "G," and "Ks" for a private key (0<Ks<r). In step S2, a hash value of a message M is calculated (f=Hash (M)).

How to obtain a hash value using a hash function is explained here. A message is input to the hash function for compression into data of a predetermined bit length. The compressed result is output as a hash value. The hash function has a number of distinct characteristics: it is difficult to predict an input from a given hash value (output); a change of a single bit in the input data to the hash function leads to changes of numerous bits in the resulting hash value; and it is also difficult to find different input data having the same hash value. Illustratively, the hash function most frequently used is MD4, MD5, or SHA-1; it may also be DES-CBC. In the last case, the final output value MAC (check value, equivalent to ICV) makes up the hash value.

In step S3, a random number "u" (0<u<r) is generated. In step S4, a coordinate "V" (Xv, Yv) is calculated using the base point multiplied by "u." An addition and a diploid operation on the elliptic curve are defined as follows:

[Expression 1]

Let $P=(Xa,Ya), Q=(Xb,Yb), R=(Xc,Yc)=P+Q$.

If P≠Q (addition), then $Xc=\lambda^2-Xa-Xb$ $Yc=\lambda \times (Xa-Xc)-Ya$ $\lambda=(Yb-Ya)/(Xb-Xa)$ If P=Q (diploid operation), then $Xc=\lambda^2-2Xa$ $Yc=\lambda \times (Xa-Xc)-Ya$ $\lambda=(3(Xa)^2+a)/(2Ya)$ Given the above factors, the point "G" is multiplied by "u." The easiest computation, at the expense of speed, is performed as follows: G, 2×G, 4×G, . . . are calculated for expansion into binary numbers. To each position where a "1" exists is added 2i×G (a value of G doubled "i" times, where "i" denotes the bit location counted from the LSB of "u").

In step S5, "c=Xv mod r" is calculated. In step S6, a check is made to see if the result of step S5 is 0. If the resulting value is not 0, step S7 is reached in which a calculation is made of "d=[(f+cKs)/u] mod r." Step S7 is followed by step S8 in which a check is made to see if the value "d" is 0. If the value "d" is not 0, then step S9 is reached in which the values "c" and "d" are output as digital signature data. If the value "r" is assumed to be 160 bits long, then the digital signature data have a length of 320 bits.

If in step S6 the value "c" turns out to be 0, then step S3 is reached again in which another random number is generated. Likewise if the value "d" is found to be 0 in step S8, step S3 is reached again and a new random number is generated.

Figure 7:
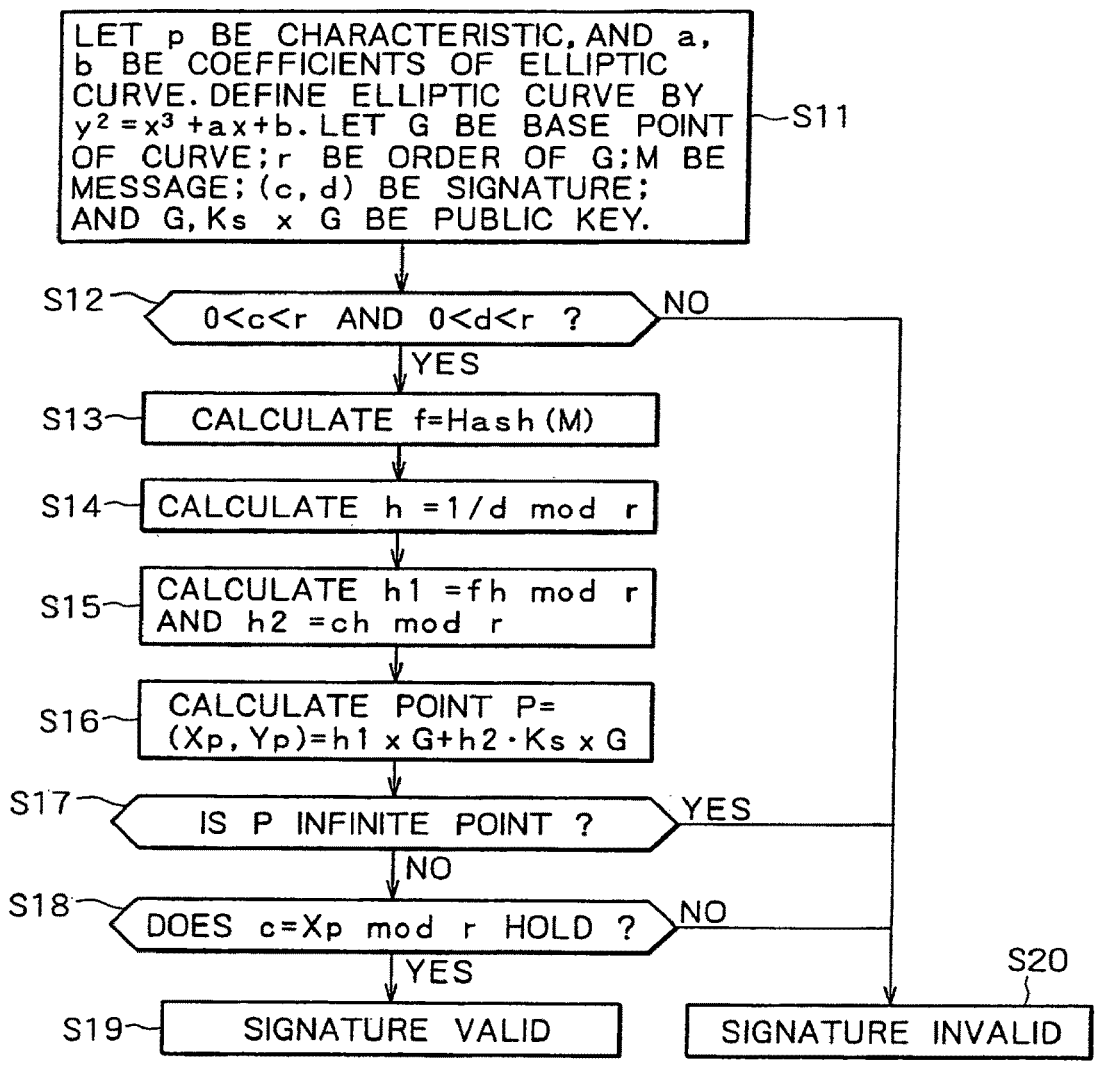
FIG. 7 is a flowchart of steps constituting an ECDSA signature verification process.

How to verify an ECC-based digital signature will now be described by referring to FIG. 7. In step S11, it is assumed that "M" stands for a message and "p" for a characteristic; that "a" and "b" denote coefficients of an elliptic curve ($y^2=x^3+ax+b$); that "G" stands for a base point on the elliptic curve and "r" for the order of "G"; and that "G" and "Ks×G" represent public keys (0<Ks<r). In step S12, a check is made to see if the digital signature data "c" and "d" satisfy the conditions of 0<c<r and 0<d<r. If the conditions are judged satisfied, step S13 is reached in which a hash value of the message "M" is calculated (f=Hash(M)). In step S14, a calculation is made of "h=1/d mod r." In step S15, "h1=fh mod r" and "h2=ch mod r" are calculated.

In step S16, a calculation is made of a point "P=(Xp, Yp)=h1×G+h2·Ks×G" using the previously calculated "h1" and "h2." Since the party currently verifying the digital signature already knows the public keys "G" and "Ks×G," it is possible to compute a scalar multiple of a point on the elliptic curve in the same manner as in step S4 of FIG. 6. In step S17, a check is made to see if the point P is an infinite point. If the point P is not an infinite point, step S18 is reached. In fact, whether the point P is an infinite point is determined in step S16. That is, if adding up "P=(X,Y)" and "Q=(X,−Y)" renders the calculation of λ impossible, that means "P+Q" constitutes an infinite point. In step S18, a calculation is made of "Xp mod r" for comparison with the digital signature data "c." If there is a match between the compared values, step S19 is reached in which the digital signature is judged valid.

When the digital signature is judged valid, that means the data have not been tampered with. It is ascertained that the parity in possession of the private key corresponding to the public keys has indeed generated the digital signature in question.

If in step S12 the digital signature data "c" or "d" fail to satisfy the condition 0<c<r or 0<d<r, then step S20 is reached. If in step S17 the point P turns out to be an infinite point, step S20 is also reached. A mismatch in step S18 between the value "Xp mod r" and the digital signature data "c" also leads to step S20.

In step S20, the digital signature is judged invalid. That means the data have been tampered with or that the party in possession of the private key corresponding to the public keys has not generated the electronic signature.

Figure 8:
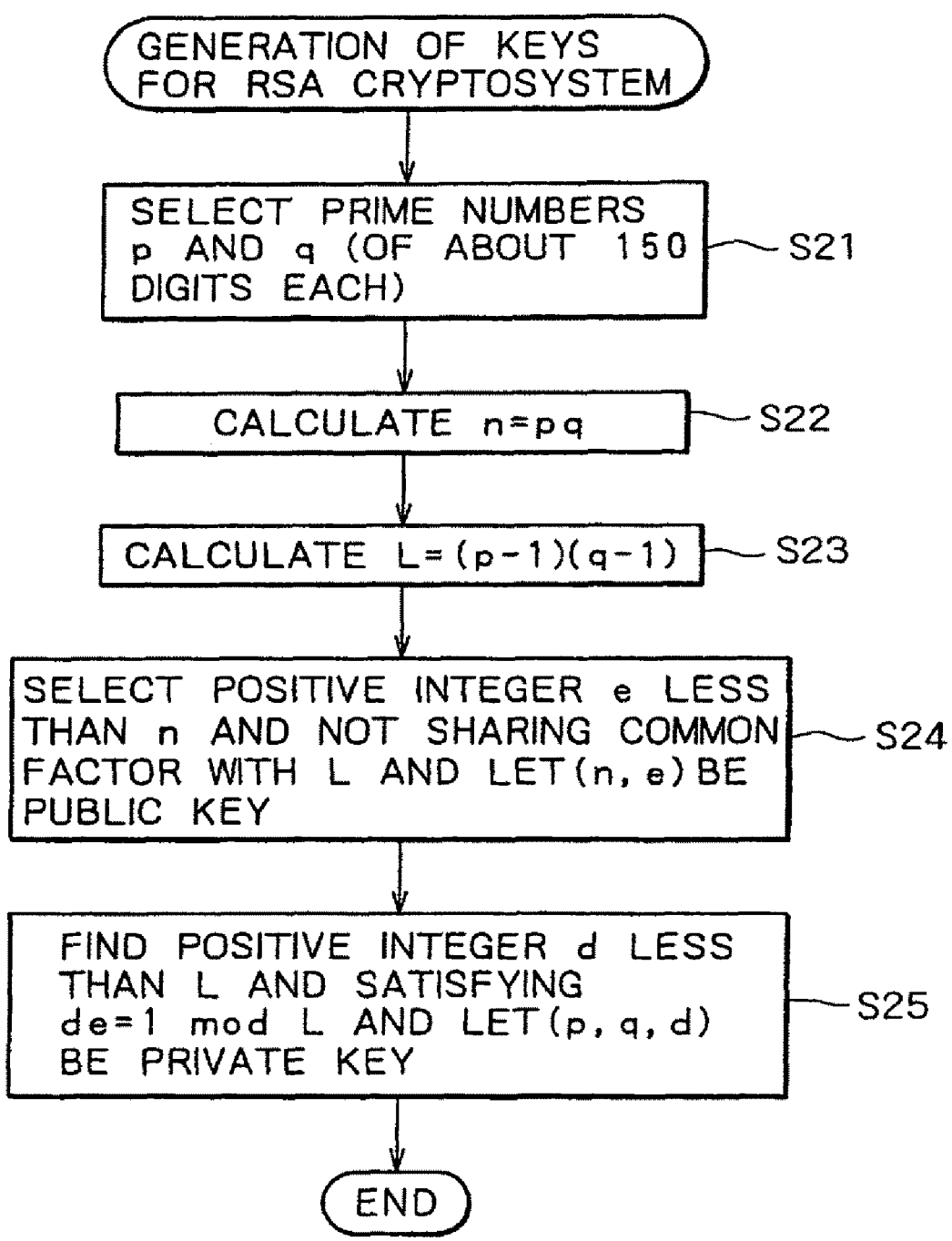
FIG. 8 is a flowchart of steps carried out to generate keys necessary for RSA signature processing.
Figure 9A:
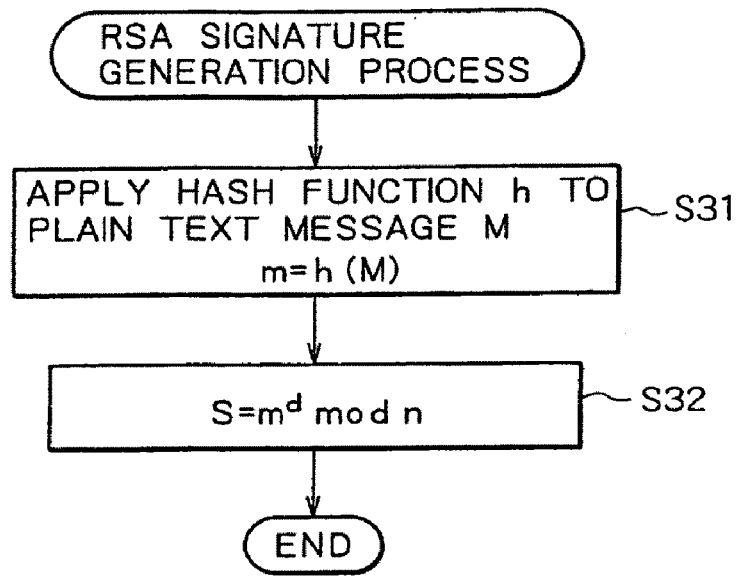
FIG. 9A is a flowchart of steps constituting an RSA signature generation process.

A digital signature algorithm based on RSA cryptosystem is described below with reference to FIGS. 8, 9A and 9B. FIG. 8 is a flowchart of steps for generating public and private keys used for signature generation and verification based on RSA cryptosystem. FIG. 9A is a flowchart of steps constituting an RSA signature generation process, and FIG. 9B is a flowchart of steps constituting an RSA signature verification process.

In the flowchart of FIG. 8 for generating public and private keys for signature generation and verification, prime numbers "p" and "q" are first selected (of about 150 digits each) in step S21. In step S22, "n=pq" is calculated. In step S23, a calculation is made of "L=(p−1) (q−1)". In step S24, a positive integer "e" less than "n" and not sharing a common factor with the value "L" is selected to let (n, e) be public keys. In step S25, a positive integer "d" less than the value "L" and satisfying "de=1 mod L" is obtained to let (p, q, d) be private keys.

Figure 9B:
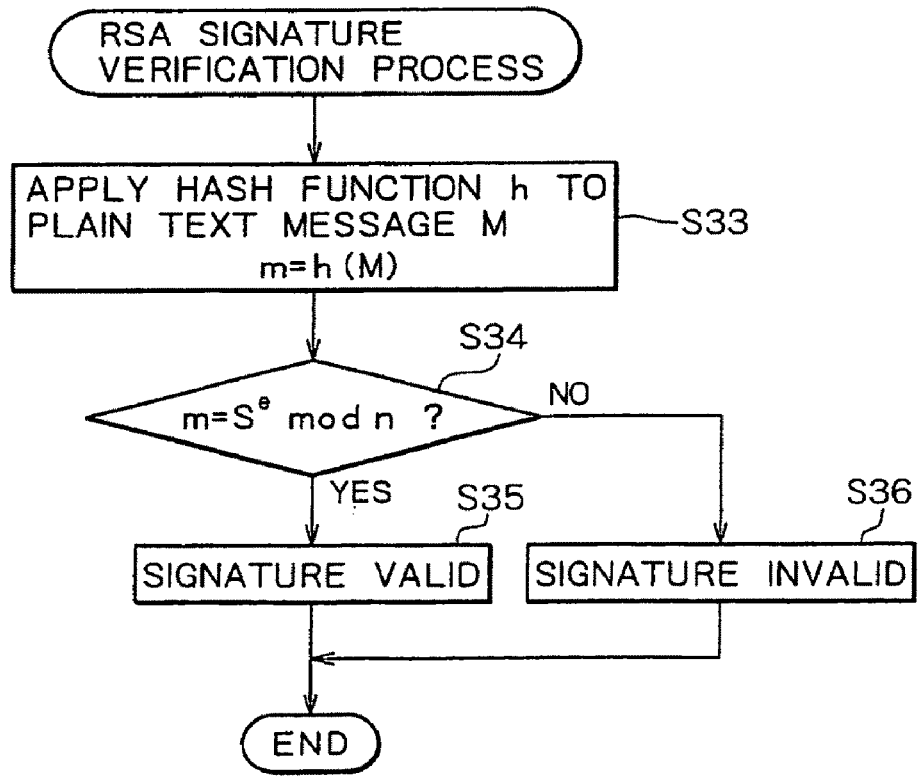
FIG. 9B is a flowchart of steps constituting an RSA signature verification process.

Signature generation and verification using the above public and private keys are conducted as shown in FIGS. 9A and 9B. Upon signature generation, as shown in FIG. 9A, "m=h (M)" is first generated in step S31 by applying a hash function "h" to the message M that is the subject of signature generation. In step S32, "S=$m^d$ mod n" is generated to let "S" be the signature.

Upon signature verification, as depicted in FIG. 9B, "m=h (M)" is first generated in step S33 by applying a hash function "h" to the message M that is the subject of signature verification. A check is made in step S34 to see whether "m=$S^e$ mod n" holds. If the expression holds, then the signature is judged valid in step S35.

When the signature is judged valid, that means the data have not been tampered with. It is ascertained that the party in possession of the private keys corresponding to the public keys has indeed generated the digital signature.

If in step S34 "m=$S^e$ mod n" does not hold, then step S36 is reached in which the signature is judged invalid. That means the data have been tampered with or that the party in possession of the private keys corresponding to the public keys has not generated the digital signature in question.

The signature verification process performed on each public key certificate determines its validity. As described above, verification of the signature requires executing encryption processing based on a signature algorithm. The signature algorithm of interest must be executable by any device acting as an end entity. Generally, a common signature algorithm is employed by end entities under control of each registration authority (RA).

Structure of the Certificate Authority (CA)]

In the inventive system, the organ called the certificate authority (CA) issuing public key certificates takes the form of a digital certification apparatus which, possessing a plurality of signature modules as described, is capable of executing diverse signature algorithms including RSA and ECDSA. Structured to accommodate multiple, different signature algorithm and parameters, the certificate authority (CA) selects signature modules as requested by registration authorities (RA) and causes the selected modules to generate signatures based on the respective cryptosystems such as RSA cryptosystem and ECDSA signature algorithm before issuing a public key certificate containing the generated signatures.

As described above with reference to FIG. 3, a public key certificate issuance request is accepted by the CA server 71 of the certificate authority (CA). Relevant modules 72a through 72n are selected as per the table that associates the registration authorities 81 through 85 under control of the CA server 71 with the assigned signature algorithms. The selected signature modules are sent a public key certificate each along with a signature execution instruction. Upon receipt of the public key certificate and signature execution instruction, each selected signature module generates a signature based on the applicable signature algorithm (e.g., RSA, ECC) and returns the signed public key certificate to the CA server 71. In turn, the CA server 71 transmits the signed public key certificate to the registration authority (one of RAs 81 through 85) that originated the public key certificate issuance request.

Figure 10:
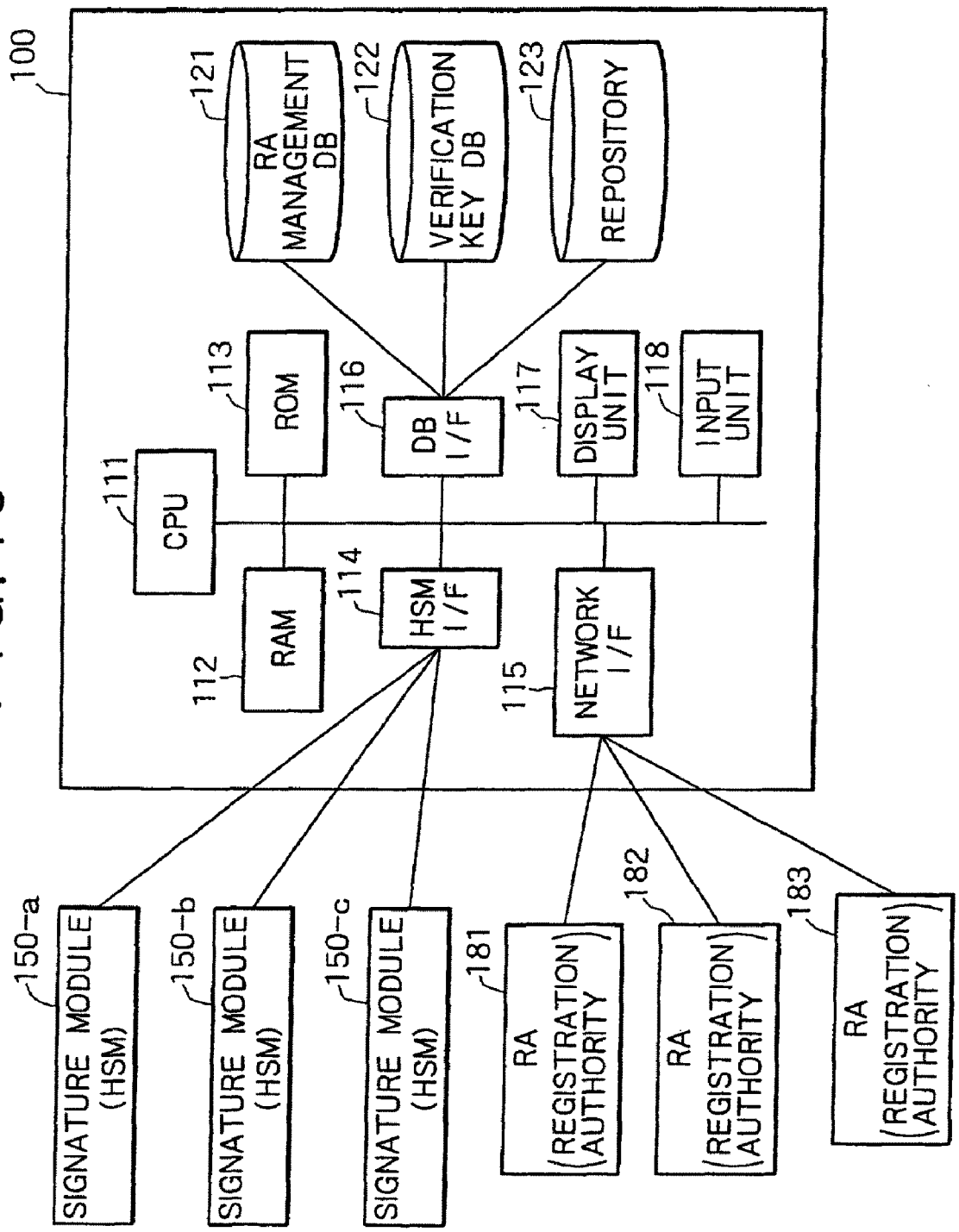
FIG. 10 is a block diagram showing a typical structure of a certificate authority (CA) server.

The CA server making up the digital certification apparatus acting as the certificate authority (CA) will now be described by referring to FIG. 10. In FIG. 10, the certificate authority has a CA server 100 and a plurality of signature modules 150 executing as many signature algorithms. Via an HSM interface 114, the CA server 100 transmits a public key certificate including the above-described structure data (see FIGS. 4 and 5) to any of the signature modules (HSM) 150. The signature module 150 that received the public key certificate generates a signature and returns the signed public key certificate to the CA server 100 through the HSM interface 114. Illustratively a PCI bus or a network such as the Ethernet may connect the CA server 100 with the signature modules 150. All communication paths between the server and the modules are established as secure paths.

The CA server 100 includes three databases: an RA management database 121 that manages information about registration authorities (RA) under control of the CA server, a verification key database 122 that stores keys for verifying public key certificates, and a repository database 123 that accommodates issued public key certificates, a list of public key certificates, and public key certificate revocation list information. These databases are accessed via a database interface (DB-I/F) 116.

The CA server 100 performs cross-certification with the registration authorities (RA) 181 through 183 to verify their identities before receiving a public key certificate issuance request from any of them via a network interface 115. Given the issuance request from any registration authority, the CA server 100 generates a public key certificate containing the data items explained above and determines a signature algorithm or algorithms based on relevant information in the RA management database 121 or on the request itself. Thereafter, the CA server 100 selects the signature module 150-x to execute the determined signature algorithm, and transmits to the selected module the generated public key certificate through the HSM interface 114. Data for signature generation such as a key length and parameters may also be sent along with the public key certificate, if necessary. On receiving the public key certificate, the signature module 150-x generates a signature based on its executable signature algorithm such as RSA or ECDSA and returns a signed public key certificate to the CA server 100. Upon receipt of the signed public key certificate, the CA server 100 retrieves an applicable verification key from the verification key database 122 to determine whether the certificate is correctly signed. After registration with the repository database 123, the CA server 100 transmits the signed public key certificate to the registration authority (RA) that issued the request.

In the CA server 100, a CPU 111 controls the above series of steps while a RAM 112 and a ROM 113 offer a storage area for accommodating processing program necessary for performing these processes and a work area in which the programs are carried out. A display unit 117 and an input unit 118 are used by an operator entering and viewing data and commands.

FIG. 11 is a tabular view depicting a typical structure of the RA (registration authority) management database 121. This database contains a table that associates RA-specific signature algorithms with the registration authorities (RA) from which the certificate authority (CA) accepts public key issuance requests.

In the structure of FIG. 11, a registration authority identified as RA0001 is shown using the RSA cryptosystem as its signature algorithm with a key length of 1,024 bits. It is also shown that the RSA cryptosystem is executed by a signature module HSM-001.

Another registration authority identified as RA0002 is shown using the RSA cryptosystem as its signature algorithm with a key length of 2,048 bits. It is indicated that the RSA cryptosystem is executed by a load-distributed setup that employs three modules HSM-002, HSM-003 and HSM-004 in combination.

Another registration authority identified as RA0003 utilizes both RSA and ECC as its signature algorithms. A circle in a "multiple-signature algorithm" column indicates that the registration authority in question permits execution of a plurality of signature algorithms. As will be described later, the multiple-signature algorithm is implemented in one of two ways. A registration authority may request the certificate authority (CA) to selectively execute, say, either an ECC signature or an RSA signature, and the certificate authority may comply with the request. Alternatively, the certificate authority may furnish a single public key certificate with a plurality of signatures executed by as many signature algorithms. Where the signature algorithm in use is the elliptic curve digital signature algorithm (ECDSA), the table contains elliptic curve parameters to be adopted in addition to the applicable key length.

If a signature module for executing a signature is fixedly associated with key length data and a parameter, then the signature is executed by use of the key length and parameter assigned to the signature module in question. If a signature module is capable of executing signatures based on a plurality of key lengths or parameters, then the CA server retrieves the applicable key lengths or the relevant key lengths and parameters from the RA management database and transmits what is retrieved to the module in question so that the latter will execute signatures according to the key lengths or the key lengths and parameters received from the CA server.

FIG. 12 is a tabular view indicating a typical structure of the verification key database. This database associates signature module identifiers identifying the signature modules for executing signatures, with keys for verifying the signatures executed by these modules. As shown in FIG. 12, the database contains HSM-IDs as signature module identifiers, names of signature algorithms executed by the associated modules, key lengths to be used, parameters, and verification keys, all listed in mutually associated relation.

The verification keys are public keys that correspond to the private keys generated by the signature modules as their signature keys. Illustratively, the CA server receives the generated private keys from the signature modules and stores what is received into the verification key database. Upon receipt of a signed public key certificate from a given signature module, the CA server retrieves the corresponding verification key (public key) from the verification key database 122 and verifies that the signature is valid before sending the certificate to the registration authority (RA) that originated the certificate issuance request.

Figure 13:
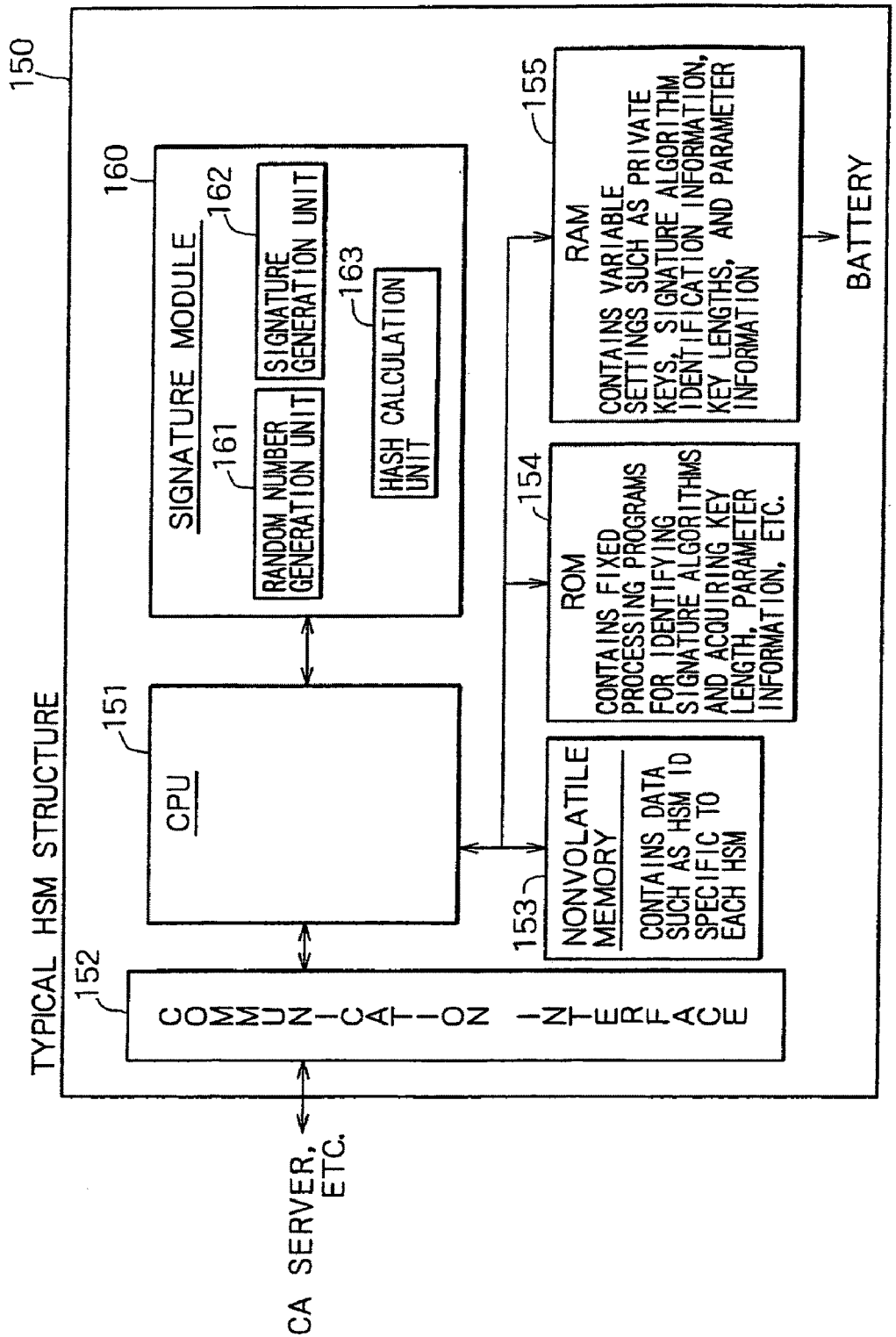
FIG. 13 is a block diagram illustrating a typical HSM (hardware security module) structure including a signature module.

Described below with reference to FIG. 13 is a typical structure of a hardware security module (HSM) containing a signature module as part of the digital certification apparatus. Each HSM has a signature module that executes a specific signature algorithm. Designed to be tamper-resistant, the HSM has its stored information such as private key information for signature generation erased if tampered with.

As shown in FIG. 13, the HSM 150 comprises: a communication interface 152 for exchanging data with a CA server; a CPU 151 for controlling processing within the HSM; a signature module 160 for executing a particular signature algorithm such as RSA or ECDSA; a nonvolatile memory 153 that stores various HSM-specific data such as an HSM identifier (ID); a ROM 154 that records processing programs for identifying signature algorithms and performing analyses in obtaining key lengths, parameter information and others from signature request data from the CA server; and a RAM 155 that accommodates variable settings such as private keys, signature algorithm identification information, key lengths, and parameter information either generated by the signature module or received from outside.

The signature module 160 includes a random number generation unit 161, a signature generation unit 162, and a hash calculation unit 163. Illustratively, if the ECDSA signature algorithm is to be executed, the signature module carries out the steps constituting the process flow described above with reference to FIG. 6; if the RSA signature algorithm is to be performed, the signature module performs the steps making up the process flow explained above by referring to FIGS. 9A and 9B.

[Process of Storing Keys into the Signature Module]

As mentioned above, each signature module executes a signature based on a specific signature algorithm such as RSA or ECDSA. A private key for signature execution by each signature module may be either generated internally by the module in question or acquired from a particular, external signature module that has generated its own key. Where a plurality of signature modules are to store a common key, an externally generated key may effectively be sent to the modules involved for storage therein.

Reading and writing of signature keys should preferably be subject to strict security rules to prevent leaks. Illustratively, all operators should be certified using passwords or like means based on dedicated software, and any signature module to which to write a key should be ascertained by checking its ID number.

Figure 14:
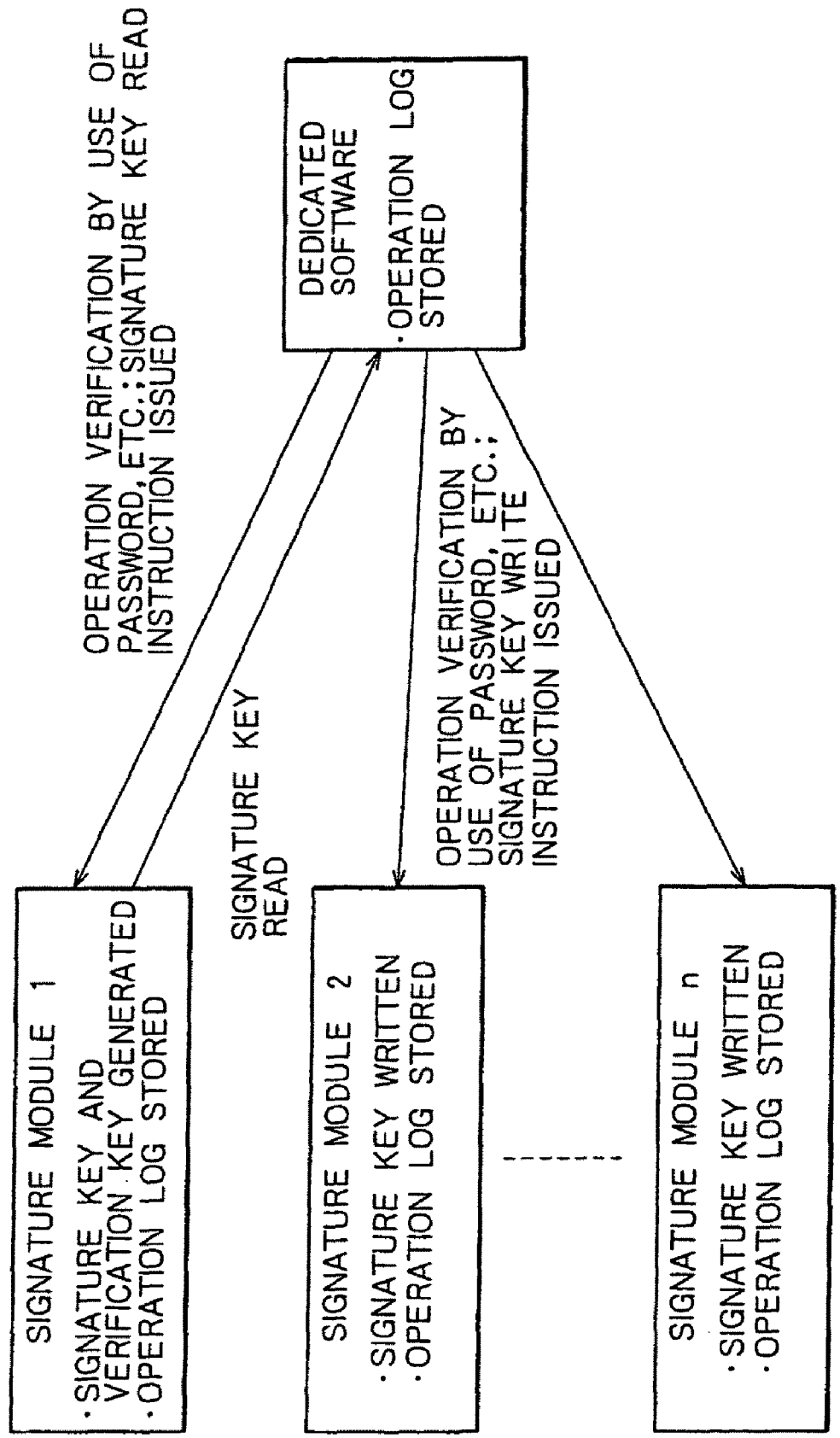
FIG. 14 is a schematic view of a setup where the same signature key is shared by a plurality of signature modules.

A typical process of having a signature key generated by a specific signature module and getting the generated key retained by HSMs having other signature modules will now be described by referring to FIGS. 14 through 17. FIG. 14 is a schematic view of a setup where a signature key is generated by a signature module 1 and transmitted to a plurality of other signature modules 2 through n. Dedicated software shown in FIG. 14 refers illustratively to a program held in a ROM of the CA server. Between the CA server and the signature modules, an operator may issue a key generation instruction to one particular signature module and causes a key (private key) generated by the module to be transmitted to the other multiple signature modules (HSMs). In that case, a verification key (public key) corresponding to the generated private key is written to the verification key database in the CA server in association with each of the HSM identifiers involved. When a key generation instruction is to be issued or key data are to be exchanged, a password-based certification process or other suitable steps should preferably be carried out between the transmitting and receiving parties to forestall illegal data transfers. Only when the parties involved are certified should the generated signature key and other related data or commands be allowed to be transmitted.

Figure 15:
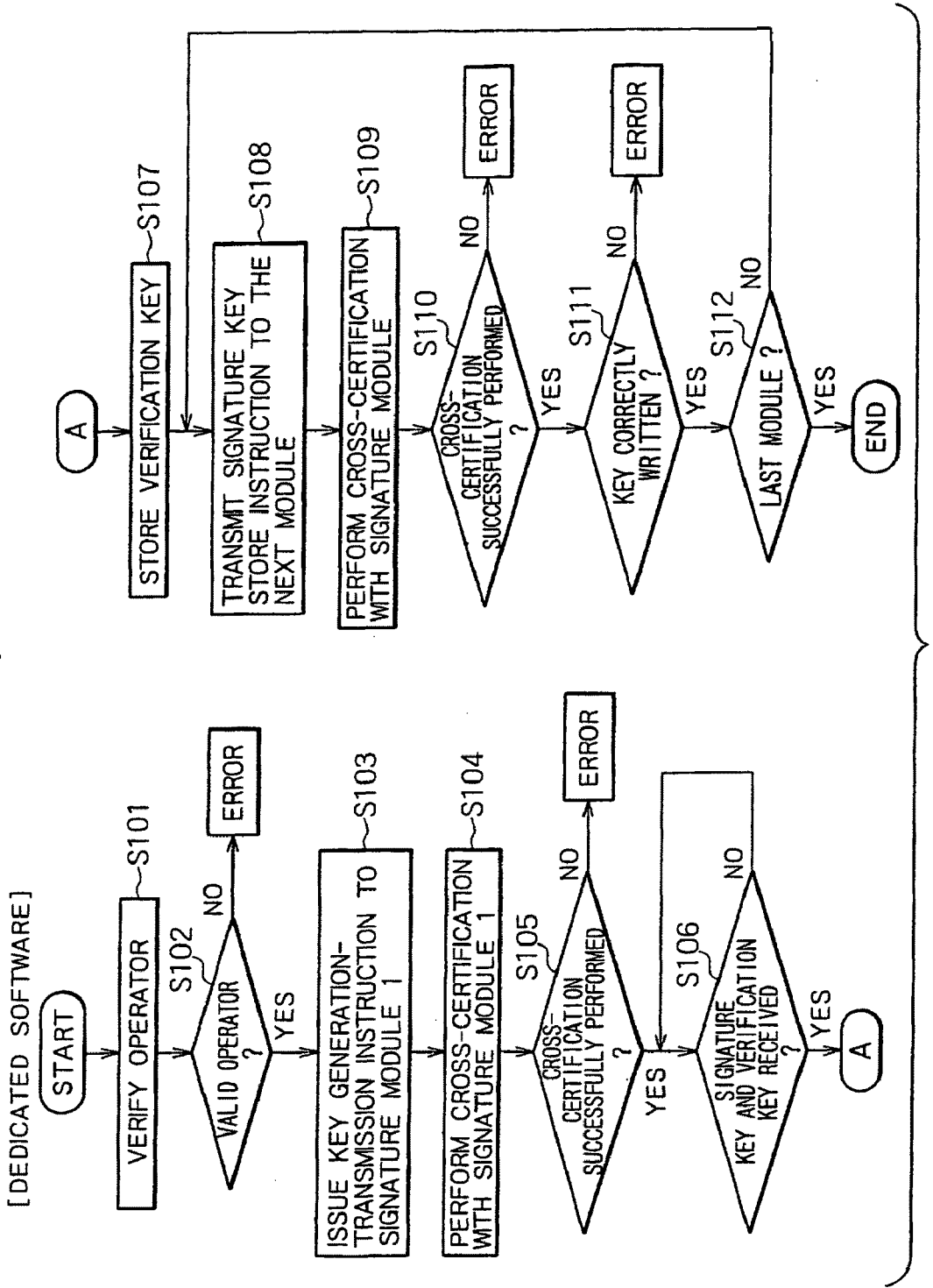
FIG. 15 is a flowchart of steps constituting the process of having the same signature key shared by a plurality of signature modules.

FIG. 15 is a flowchart of steps constituting a typical process performed by the CA server using dedicated software. This process involves having a key generation instruction issued to a specific signature module (signature module 1) to get a signature key generated by the module 1 before transmitting the key to other signature modules.

The operator who would perform steps to generate and store a signature key is first authenticated in step S101. Only a previously registered operator is authorized to carry out the signature key generation process. A check is made in step S102 to see whether the submitted password, fingerprint data, etc., attest to the valid operator. If the operator is judged valid, step S103 is reached in which a key generation-transmission instruction is issued to the signature module 1 (HSM1) requesting the latter to generate the signature key.

In step S104, cross-certification is carried out between the signature module 1 (HSM1) on the one hand, and the apparatus that has issued the key generation-transmission instruction (e.g., CA server) on the other hand. The cross-certification is executed based on common key cryptosystem or public key cryptosystem. Keys for such certification are retained in advance by the devices involved. When the cross-certification is successfully concluded in step S105, the CA server waits for a signature key and a verification key to arrive from the signature module. Upon receipt of the signature key and verification key from the signature module in step S106, the verification key is stored into the verification key database in step S107. In step S108, a signature key store instruction is output to another signature module (HSM) that will utilize the same signature key. In step S109, cross-certification is performed with the new signature module. When the cross-certification with the signature module in question is successfully concluded in step S110, the signature key is transmitted to that module. An acknowledgment received from the signature module in step S111 indicates that the key has been normally stored inside, thus signaling the end of the key write operation to the current signature module. Steps S108 through S111 are repeated on all signature modules to which the signature key is to be written. When the key is judged written to all signature modules involved in step S112, the process is terminated.

Figure 16:
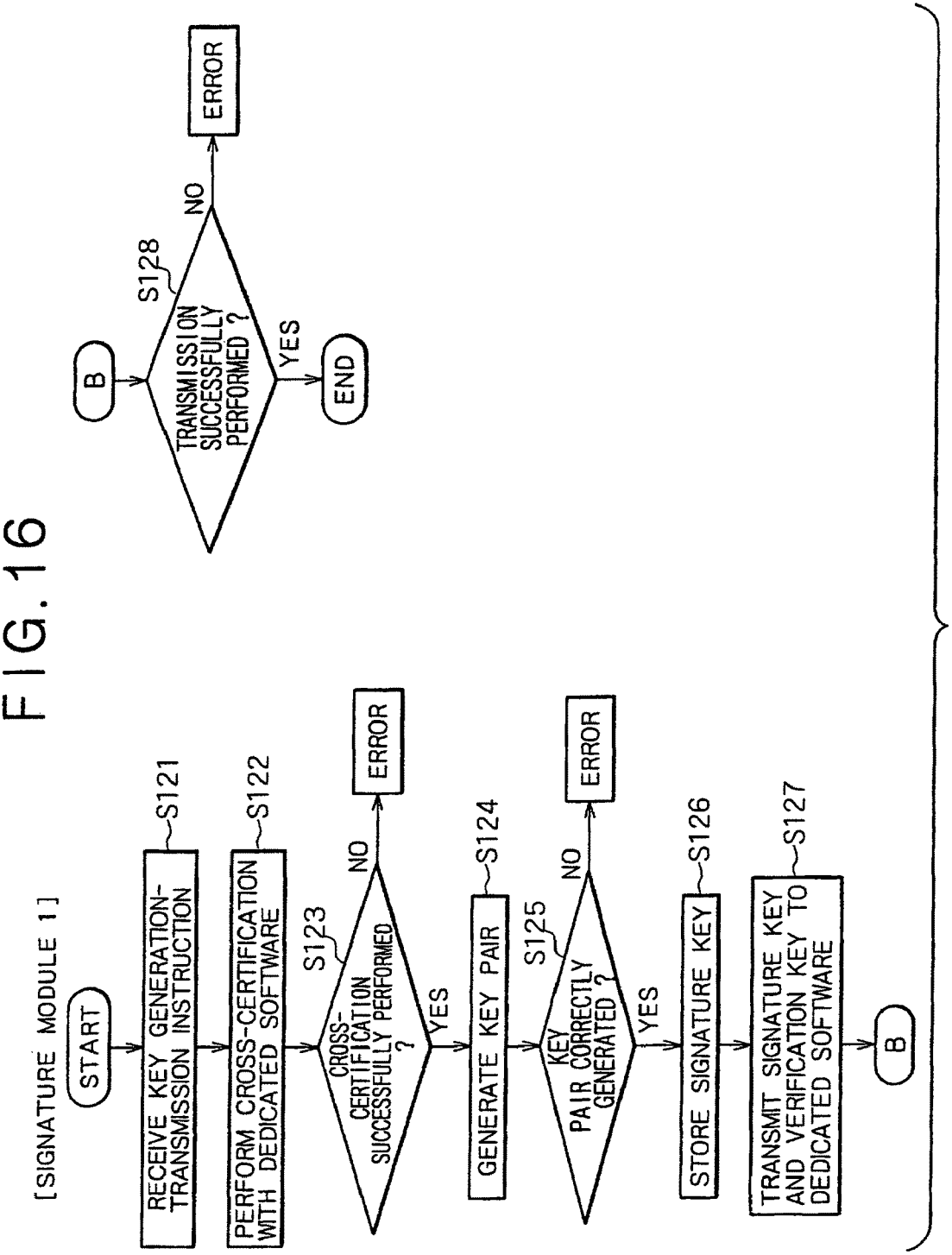
FIG. 16 is another flowchart of steps constituting the process of having the same signature key shared by a plurality of signature modules.

Another signature key generation process performed by the signature module 1 is described below by referring to FIG. 16. In step S121, the signature module 1 receives a key generation-transmission instruction. In step S122, cross-certification is carried out between the signature module 1 and dedicated software (embodied by the CA server). When the cross-certification is successfully concluded in step S123, the signature module 1 generates a key pair consisting of a signature key and a verification key in step S124. When the key pair is judged correctly generated in step S125, the signature key is retained by the device itself in step S126. The generated signature key and verification key are further transmitted to the dedicated software (CA server) in step S127. When the transmission is judged successful in step S128, the process is terminated.

Figure 17:
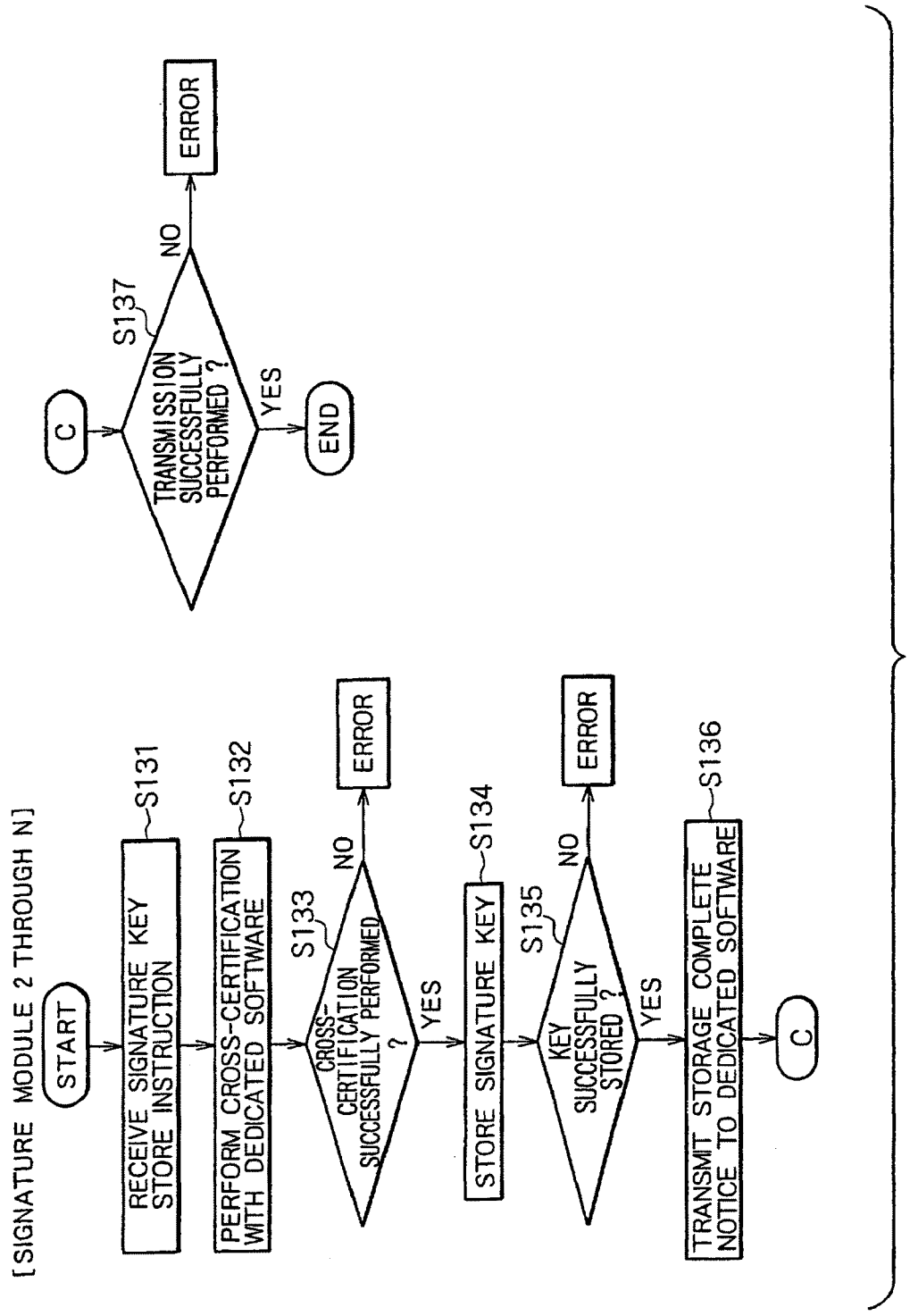
FIG. 17 is yet another flowchart of steps constituting the process of having the same signature key shared by a plurality of signature modules.

A signature key storing process performed by signature modules 2 through N is described below with reference to FIG. 17. In step S131, the signature modules 2 through N receive a signature key store instruction each. In step S132, cross-certification is carried out between the signature modules 2 through N on the one hand and the dedicated software (CA server) on the other hand. When the cross-certification is judged successfully concluded in step S133, the signature key is stored into each of the signature modules involved in step S134. When the signature key is judged correctly stored in step S135, a storage complete notice is transmitted to the dedicated software (CA server) in step S136. When the transmission of the notice is judged successful in step S137, the process is terminated.

[Processing by the CA Server]

Processing by the CA server will now be described in two categories: (1) processing performed upon key generation by a signature module (HSM), and (2) processing carried out upon issuance of a public key certificate and upon signature execution.

The process by the CA server upon key generation by the signature module (HSM) is described below by referring to FIG. 18. In FIG. 18, the process shown to the left is that which is performed by the CA server, while the process indicated to the right is carried out by an HSM having a signature module. Although cross-certification steps are not shown in FIG. 18, these steps are still carried out between the CA server and the signature module in the same manner as FIGS. 16 and 17 if they are interconnected in an externally accessible manner.

In step S201, the CA server issues a key generation instruction to the HSM. The key generation instruction may include a key length and a parameter if necessary. It is possible to issue a plurality of key generation instructions based on different key lengths and different parameters. On receiving the instruction in step S211, the HSM generates at least one key pair consisting of a signature key and a verification key in step S212. When the key pair is judged correctly generated in step S213, the verification key is transmitted to the CA server in step S214. The signature key is retained by the device itself in step S215.

Upon receipt of the verification key from the HSM in step S202, the CA server stores the received key into the verification key database in step S203. Where necessary, the RA management database and the repository database are updated in step S204. The verification key database and other databases accommodate key lengths, parameters and other data with regard to each data entry.

The processes carried out by the CA server upon issuance of a public key certificate and upon signature execution are described below by referring to FIGS. 19 and 20. In step S231 of FIG. 19, the CA server generates certificate data (see FIGS. 4 and 5) in response to a certificate issuance request from a registration authority. In step S232, the CA server determines HSMs that should perform signature execution.

How HSMs are determined is described below in detail by referring to FIG. 20. In step S251 of FIG. 20, the CA server receives a certificate issuance request from a registration authority (RA). Based on the identifier of the requesting registration authority, the CA server searches through the RA management database (see FIG. 11) in step S252. A check is first made to see if the requesting registration authority is subject to load distribution on the basis of the applicable load distribution entry in the RA management database. If the registration authority in question is judged subject to load distribution, step S258 is reached. In step S258, a plurality of HSMs are selected according to predetermined criteria for sequential or parallel use of the selected HSMs.

If the check in step S253 reveals that the requesting registration authority is not subject to load distribution, step S254 is reached. In step S254, a check is made by referencing the RA management database (FIG. 11) to see whether the registration authority in question corresponds to multiple signature algorithms. If in step S254 the registration authority is judged corresponding to multiple signature algorithms, step S255 is reached. In step S255, a search is made through the RA management database for data entries corresponding to the requested signature algorithms in the public key certificate issuance request. If relevant data entries are found in step S256, HSM identifiers associated with the RA identifier are acquired in step S257 from the database, and the HSMs having the obtained HSM identifiers are determined as the signature modules.

If the certificate issuance request specifies signature algorithms, key lengths and parameters, then the CA server may alternatively select HSMs by making a search through the RA management database in accordance with the designated signature algorithms, key lengths and parameters.

When the HSMs for signature execution are determined as described above, step S233 of FIG. 19 is reached in which the generated public key certificate data are transmitted to the selected HSMs. On receiving the public key certificate data in step S241, the HSMs execute signatures in step S242 and transmit a signed certificate to the CA server in step S243.

Upon receipt of the signed certificate from the HSMs in step S234, the CA server retrieves verification keys associated with the HSM identifiers from the verification key database in step S235. In step S236, the CA server verifies the signatures using the retrieved verification keys. If the verification is judged successful in step S237, the CA server transmits the signed certificate to the requesting registration authority (RA), which terminates the process.

[Typical Processes of Issuing Public Key Certificates]

Typical processes of issuing public key certificates performed between an end entity (EE), registration authorities (RA), and a certificate authority (CA) are explained below.

FIGS. 21A-C illustrates a typical configuration including an end entity (EE) 300, registration authorities (RA) 311 and 312, a certificate authority (CA) server 321; and HSMs 331, 332 and 333 having a signature module each. The end entity 300 issues a public key certificate issuance request to the CA server 321 through the registration authority 311 or 312.

For the above setup, it is assumed that the RA management database of the CA server contains data such as those shown in FIG. 21B and that the verification key database accommodates data listed illustratively in FIG. 21C. As evident from the RA management database entries in subfigure (a), the registration authority 311 identified as RA1 allows a signature module HSM1 to execute a signature based on the RSA signature algorithm with a key length of 1,024 bits. The registration authority 312 identified as RA2 permits signature execution based on multiple algorithms: RSA signature algorithm with a key length of 2,048 bits, ECDSA with a key length of 192 bits and a parameter p=xx . . . , and ECDSA with a key length of 192 bits and a parameter p=yy . . . . For the registration authority RA2, RSA signature is executed by a signature module HSM2 and ECDSA signature by a signature module HSM3. The verification key database contains signature algorithms, key lengths, parameter information, and verification keys corresponding to the HSMs configured.

With these settings in effect, the end entity (EE) 300 sends a public key certificate issuance request to a given registration authority (RA). Some examples in which the request is output to the RA by the end entity will now be described.

FIGS. 22A-C shows an example in which the end entity (EE) 300 outputs a public key certificate issuance request to the registration authority (RA1) 311. Numerals (1) through (10) in FIG. 22A represent steps to be taken by the parties involved. These steps are described below in ascending order.

(1) The end entity (EE) 300 transmits to the registration authority (RA1) 311 data including user data necessary for issuing a public key certificate in the form of a public key certificate issuance request.

(2) The registration authority (RA1) 311 verifies that what is received is a legitimate certificate issuance request from the end entity (EE) 300, registers the recasting user, and carries out other related steps.

(3) The registration authority 311 then transmits the certificate issuance request to the CA server 321, along with a certificate issuance request command, necessary message data including certificate storage data, and a registration authority identifier (ID).

(4) Upon receipt of the certificate issuance request, the CA server 321 references the RA management database to determine an HSM for signature execution. In this example, a module HSM1 is selected as the signature execution module in accordance with the RA management database entries shown in FIG. 21B.

(5) The CA server 321 outputs a signature generation instruction to the signature module (HSM1) 331. The instruction, as shown in FIG. 22C, contains a signature generation instruction command and message data for a certificate to be generated. If the module HSM1 is capable of generating variable length keys, the signature generation instruction may include data for specifying a key length.

(6) The module (HSM1) 331 performs signature execution in keeping with the signature generation instruction. In this example, the module executes its signature based on the RSA algorithm (7) After the signature execution, the module (HSM1) 331 transmits a signed public key certificate to the CA server 321.

(8) The CA server 321 retrieves a verification key from the verification key database to check whether the signature on the received public key certificate is valid.

(9) If the signature is judged valid, the CA server 321 sends the signed public key certificate to the requesting registration authority (RA1) 311.

(10) In turn, the registration authority (RA1) 311 forwards the signed public key certificate received to the requesting end entity (EE) 300.

FIGS. 23A-C shows another example in which the end entity (EE) 300 outputs a public key certificate issuance request to the registration authority (RA2) 312. Numerals (1) through (10) in FIG. 23A represent steps to be taken by the parties involved. These steps are described below in ascending order.

(1) The end entity (EE) 300 transmits to the registration authority (RA2) 312 data including user data necessary for issuing a public key certificate in the form of a public key certificate issuance request.

(2) The registration authority (RA2) 312 verifies that what is received is a legitimate certificate issuance request from the end entity (EE) 300, registers the requesting user, and carries out other related steps.

(3) The registration authority 312 then transmits the certificate issuance request to the CA server 321, along with a certificate issuance request command, necessary message data including certificate storage data, a registration authority identifier (ID); and data specifying a signature algorithm, a key length and parameters, as shown in of FIG. 23B.

(4) Upon receipt of the certificate issuance request, the CA server 321 references the RA management database to determine an HSM for signature execution. In this example, a module HSM3 is selected as the signature execution module in accordance with the RA management database entries shown in subfigure (a) of FIG. 21.

(5) The CA server 321 outputs a signature generation instruction to the signature module (HSM3) 333. The instruction, as shown in of FIG. 23C, contains a signature generation instruction command, message data for a certificate to be generated, and data designating the key length and parameters.

(6) The module (HSM3) 333 performs signature execution in accordance with the signature generation instruction. In this example, the module executes its signature based on the ECDSA.

(7) After the signature execution, the module (HSM3) 333 transmits a signed public key certificate to the CA server 321.

(8) The CA server 321 retrieves a verification key from the verification key database to check whether the signature on the received public key certificate is valid.

(9) If the signature is judged valid, the CA server 321 sends the signed public key certificate to the requesting registration authority (RA2) 312.

(10) In turn, the registration authority (RA2) 312 forwards the signed public key certificate received to the requesting end entity (EE) 300.

FIGS. 24A-D shows yet another example in which the end entity (EE) 300 outputs a public key certificate issuance request to the registration authority (RA2) 312, soliciting simultaneous execution of a plurality of signatures. Numerals (1) through (14) in FIG. 24 denote steps to be taken by the parties involved. These steps are described below in ascending order.

(1) The end entity (EE) 300 transmits to the registration authority (RA2) 312 data including user data necessary for issuing a public key certificate in the form of a public key certificate issuance request.

(2) The registration authority (RA2) 312 verifies that what is received is a legitimate certificate issuance request from the end entity (EE) 300, registers the requesting user, and carries out other related steps.

(3) The registration authority 312 then transmits the certificate issuance request to the CA server 321, along with a certificate issuance request command, necessary message data including certificate storage data, a registration authority identifier (ID); and data specifying a plurality of signature algorithms, key lengths and parameters, as shown in FIG. 24B.

(4) Upon receipt of the certificate issuance request, the CA server 321 references the RA management database to determine HSMs for signature execution. In this example, modules HSM 2 and HSM3 are selected as the signature execution modules in accordance with the RA management database entries shown in FIG. 21B.

(5) The CA server 321 outputs a signature generation instruction first to the signature module (HSM2) 332. The instruction, as shown in FIG. 24C, contains a signature generation instruction command, message data for a certificate to be generated, and data designating a key length.

(6) The module (HSM2) 332 performs signature execution in accordance with the signature generation instruction. In this example, the module executes its signature based on the ECDSA.

(7) After the signature execution, the module (HSM2) 332 transmits a signed public key certificate to the CA server 321.

(8) The CA server 321 retrieves a verification key from the verification key database to check whether the signature on the received public key certificate is valid.

(9) The CA server 321 then outputs the signature generation instruction to the signature module (HSM3) 333. The instruction, as shown in FIG. 24D, contains a signature generation instruction command, message data for a certificate to be generated, and data designating the key length and parameters.

(10) The module (HSM3) 333 performs signature execution in accordance with the signature generation instruction. In this case, the module executes its signature based on the ECDSA.

(11) After the signature execution, the module (HSM3) 333 transmits a signed public key certificate to the CA server 321.

(12) The CA server 321 retrieves verification keys from the verification key database to check whether the signatures on the received public key certificate are valid.

(13) If the signatures are judged valid, the CA server 321 sends the signed public key certificate to the requesting registration authority (RA2) 312.

(14) In turn, the registration authority (RA2) 312 forwards the signed public key certificate received to the requesting end entity (EE) 300.

[Privately Managed Signature Module Structure]

Described below is an example of how the signature module structure of a digital certification apparatus acting as a certificate authority is protected privately against external tampering.

Figure 25:
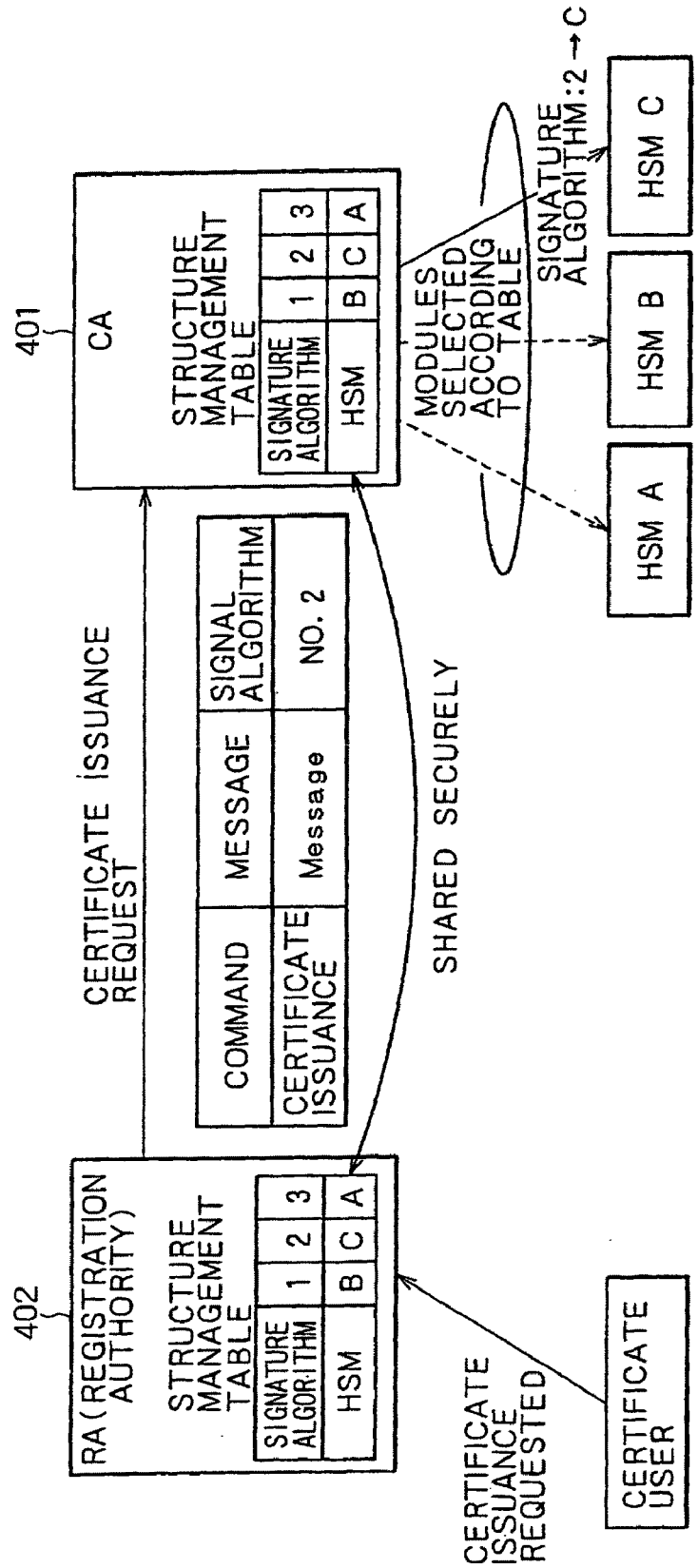
FIG. 25 is a schematic view of a typical setup for privately managing a signature module structure.

FIG. 25 is a block diagram outlining the setup of this example. As shown in FIG. 25, the setup includes a certificate authority (CA) 401 and a registration authority (RA) 402 each having a signature module structure management table.

The signature module structure management table associates signature algorithm identifiers (1 through n) with HSMs executing their respectively assigned signature algorithms. This table is generated by the certificate authority (CA) 401 randomly associating the signature algorithm identifiers with the HSMs involved. The table is updated periodically or as needed. The generated table is delivered to each registration authority (RA) 402. When requested to issue a public key certificate by an end entity, the registration authority (RA) 402 generates a certificate issuance request furnished with a signature algorithm identifier (any one of 1 through n) and sends the request to the certificate authority (CA) 401.

The certificate authority (CA) 401 searches the signature module structure management table for an HSM based on the signature algorithm identifier contained in the certificate issuance request received. When the corresponding HSM is selected, the certificate authority (CA) 401 outputs a signature request to the HSM in question.

In the above setup, a leaked signature module structure management table does not result in any essential signature algorithm leaking out. This makes it possible effectively to prevent illegal signature generation by a third party. It is preferred that the signature module structure management table be made tamper-resistant by having it signed by the certificate authority.

[Distributed Signature Processing]

How a signature is executed illustratively by a plurality of signature modules (HSM) will now be described by referring to FIG. 26.

Figure 26:
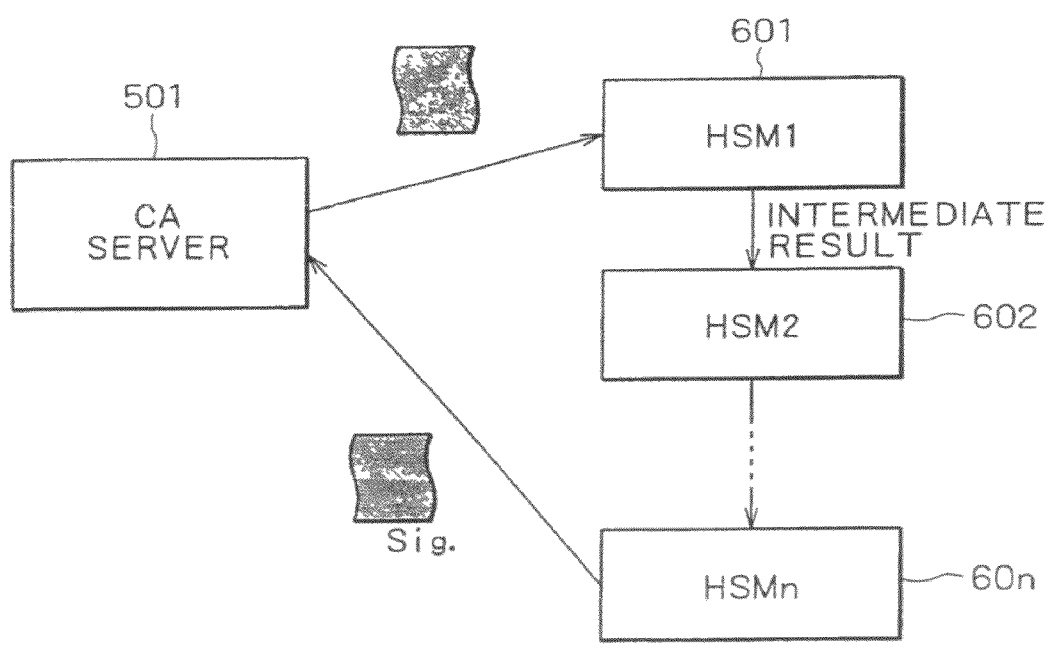
FIG. 26 is a schematic view of the process of getting a plurality of signature modules to perform signature processes in cooperation.

A CA server 501 in FIG. 26, upon receipt of a public key certificate issuance request from a registration authority (RA), divides the signature execution process into a plurality of steps (exponentiating operation, hash value generation, etc.). The CA server 501 then requests different HSMs 601 through 60n to perform the different steps of signature execution.

Illustratively, where the ECC signature algorithm is in use, the process of ECC signature generation may be divided into such steps as hash value generation, random number generation, generation of a coordinate value V, etc., as described earlier with reference to FIG. 6. These steps are carried out individually by independent modules. The result of processing by one module is forwarded to the next downstream module for another process. The data transferred from one module to another are given an intermediate signature by each transmitting module; each receiving module adds another intermediate signature to the collection of the transferred data and intermediate signatures furnished so far. The last-signed result is received by the CA server 501 from the module 60n. Signature generation thus involves the series of steps being carried out in a predetermined order by all modules involved.

It is also possible for different signature modules (HSM) to execute different signatures successively onto a single message. For example, the module HSM1 (601) may execute an RSA signature, the module HSM2 (602) may execute an ECDSA signature "a," and the module HSMx (60x) may carry out an ECDSA signature "x" using a different parameter. The result of the execution of these multiple signatures is transmitted to the CA server 501. In this case, each transmitting module also executes an intermediate signature onto the message, and each receiving module adds another intermediate signature to the collection of the transferred message data and intermediate signatures furnished so far. It should be noted that the CA server 501 in this setup is required individually to manage verification keys regarding the different modules.

As described, signatures are generated by a plurality of signature modules under control of the certificate authority (CA), the modules performing their respectively assigned signature generation processes while transferring a public key certificate made of signature-supplemented message data from one module to another in a predetermined order. Because signature generation based on any single signature module is impossible, the generation of an illegal signature by a third party taking advantage of data leaks from any module is made effectively unfeasible.

Through the use of the public key certificate issuing system, public key certificate issuing method, digital certification apparatus, and program storage medium according to the invention, there is provided as described a certificate authority (CA) which has a plurality of signature modules each executing a different signature algorithm such as RSA or ECDSA and which allows any one of the signature modules selectively to execute a signature as requested by any registration authority (RA) under control of the certificate authority. There is no need to establish a plurality of certificate authorities to deal with multiple signature algorithms; one certificate authority can address a plurality of registration authorities (RA) requesting different signature algorithms. The single certificate authority can issue public key certificates each bearing a signature of a different algorithm.

According to the inventive public key certificate issuing system, public key certificate issuing method, digital certification apparatus, and program storage medium, there is further provided a certificate authority (CA) which has a plurality of signature modules each executing a different signature algorithm such as RSA or ECDSA and which allows some of the signature modules selectively to execute a plurality of signatures as requested by any registration authority (RA) under control of the certificate authority. The certificate authority in this setup permits generation of a single public key certificate carrying a plurality of signatures based on different algorithms.

Also according to the inventive public key certificate issuing system, public key certificate issuing method, digital certification apparatus, and program storage medium, it is possible to provide a plurality of signature modules each executing part of steps representing various signature algorithms such as RSA and ECDSA, the modules being suitably coordinated to execute an integral signature process made up of the steps. This arrangement also forestalls illegal signature generation by a third party utilizing a leak of data from an individual signature module.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A public key certificate issuing system comprising:
   a certificate authority for issuing a public key certificate for an entity, the certificate authority including a plurality of signature modules each executing a different encryption algorithm; and
   a registration authority that receives a public key certificate issuance request from the entity, and transmits the received request to the certificate authority;
   wherein the certificate authority selects a predetermined combination of signature modules based on the registration authority transmitting the public key certificate issuance request, the predetermined combination of signature modules executing a combination of encryption algorithms, the selection of predetermined combination of signature modules being made based on the registration authority that transmits the received request.

2. A public key certificate issuing system according to claim 1, wherein the predetermined combination of signature modules is exclusive to public key certificate issuance requests from the registration authority.

3. A public key certificate issuing system according to claim 1, wherein the predetermined combination of signature modules execute in steps to generate a digital signature.

4. A public key certificate issuing system according to claim 1, wherein each of the plurality of signature modules executes multiple encryption algorithms.

5. A public key certificate issuing system according to claim 1, wherein the selected predetermined combination of signature modules are selected based on key length and parameter information provided by the public key certificate issuance request.

6. A public key certificate issuing system according to claim 1, wherein the certificate authority outputs a signature processing request to the plurality of signature modules; and
   wherein each selected signature module, in the predetermined combination of signature modules, attaches a digital signature to message data constituting the public key certificate in response to the signature processing request received from the certificate authority server.

7. A public key certificate issuing system according to claim 1, wherein the certificate authority has a registration authority management database containing registration authority management data that associates a given registration authority with a predetermined combination of encryption algorithms; and
   wherein, given a public key certificate issuance request from the given registration authority, the certificate authority selects the given predetermined combination of signature modules associated with the given predetermined combination of encryption algorithms based on the registration authority management data.

8. A public key certificate issuing system according to claim 7, wherein the registration authority management data includes key length and parameter information applicable to signatures.

9. A public key certificate issuing method for use with a certificate authority for issuing a public key certificate in response to a public key certificate issuance request from an entity, transmitted to the certificate authority from a registration authority, the method comprising the steps of:
   receiving a public key certificate issuance request from the registration authority;

selecting, at the certificate authority, a predetermined combination of signature modules based on the registration authority that transmitted the received request, the predetermined combination of signature modules executing a combination of encryption algorithms;

generating a digital signature by executing the combination of signature modules; and attaching the digital signature to message data constituting a public key certificate.

10. A public key certificate issuing method according to claim 9, wherein the predetermined combination of signature modules is exclusive to public key certificate issuance requests from the registration authority.

11. A public key certificate issuing method according to claim 9, wherein each of the plurality of signature modules is configured to execute multiple encryption algorithms.

12. A public key certificate issuing method according to claim 9, wherein the selected predetermined combination of signature modules are selected based on key length and parameter information provided by the public key certificate issuance request.

13. A public key certificate issuing method according to claim 9, wherein the selecting step further comprises selecting the signature module based on a registration authority management database which stores registration authority management data for associating registration authorities issuing public key certificate issuance requests with a encryption algorithm specific to each of the registration authorities.

14. A public key certificate issuing method according to claim 13, wherein the registration authority management database includes key length and parameter information applicable to signatures.

15. A digital certification apparatus for constituting a certificate authority which issues a public key certificate used by an entity in association with a request transmitted to the certificate authority by a registration authority:

wherein the digital certification apparatus, having a plurality of signature modules, each executing a different encryption algorithm, selects a predetermined combination of signature modules based on a public key certificate issuance request received from outside the digital certification apparatus and based upon the registration authority, and causes the selected predetermined combination of signature modules to attach a digital signature to message data constituting a public key certificate.

16. A digital certification apparatus according to claim 15, wherein each of the plurality of signature modules is configured to execute multiple encryption algorithms.

17. A digital certification apparatus according to claim 15, further comprising a registration authority management database which stores registration authority management data for associating registration authorities issuing public key certificate issuance requests with an encryption algorithm specific to each of the registration authorities;

wherein, given a public key certificate issuance request from any registration authority, the digital certification apparatus selects the signature module associated with the relevant encryption algorithm based on the registration authority management data.

18. A digital certification apparatus according to claim 15, wherein the registration authority management data include key length and parameter information applicable to signatures.

19. A digital certification apparatus according to claim 15, wherein the encryption algorithm designation information includes key length and parameter information applicable to signatures.

20. A computer program product comprising a non-transitory computer readable medium including program code thereon for carrying out public key certificate issuance processing to issue a public key certificate for use by an entity, the computer program code being executable to perform operations comprising:

selecting, at the certificate authority, a predetermined combination of signature modules based on the registration authority that transmitted the received request, the predetermined combination of signature modules executing a combination of encryption algorithms;

generating a digital signature by executing the combination of signature modules; and attaching the digital signature to message data constituting a public key certificate.

* * * * *